A. E. PAIGE.
MECHANISM FOR MAKING BIFOCAL LENSES.
APPLICATION FILED MAR. 4, 1915.
1,269,568.
Patented June 11, 1918.
12 SHEETS—SHEET 8.
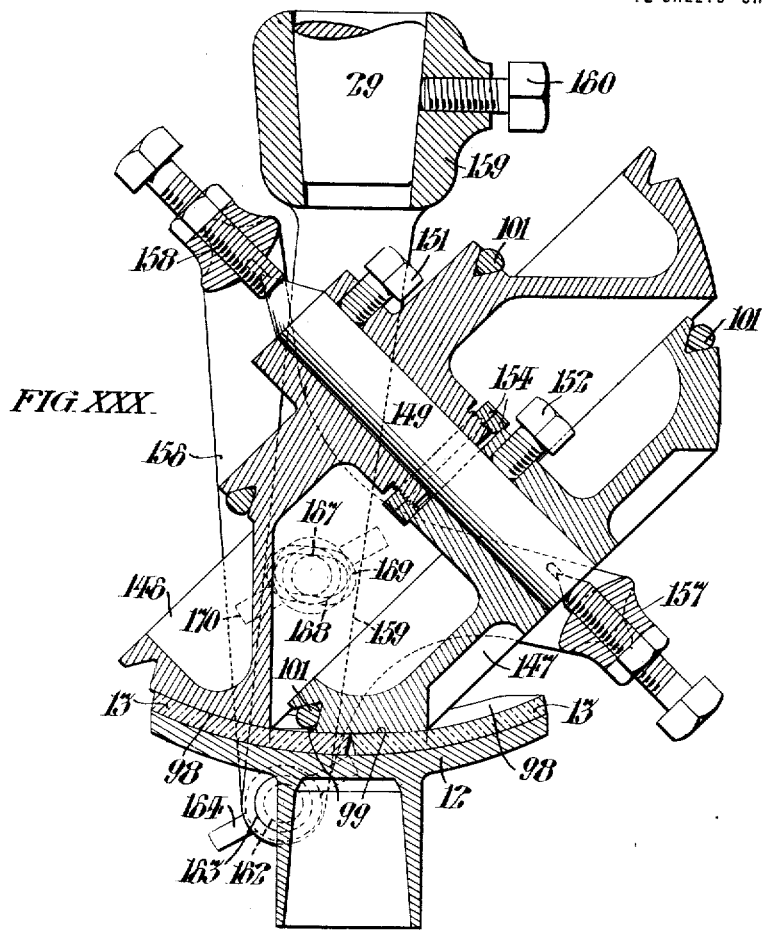
FIG. XXX.
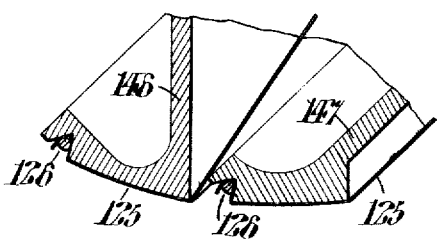
FIG. XXXI.
WITNESSES:
INVENTOR:

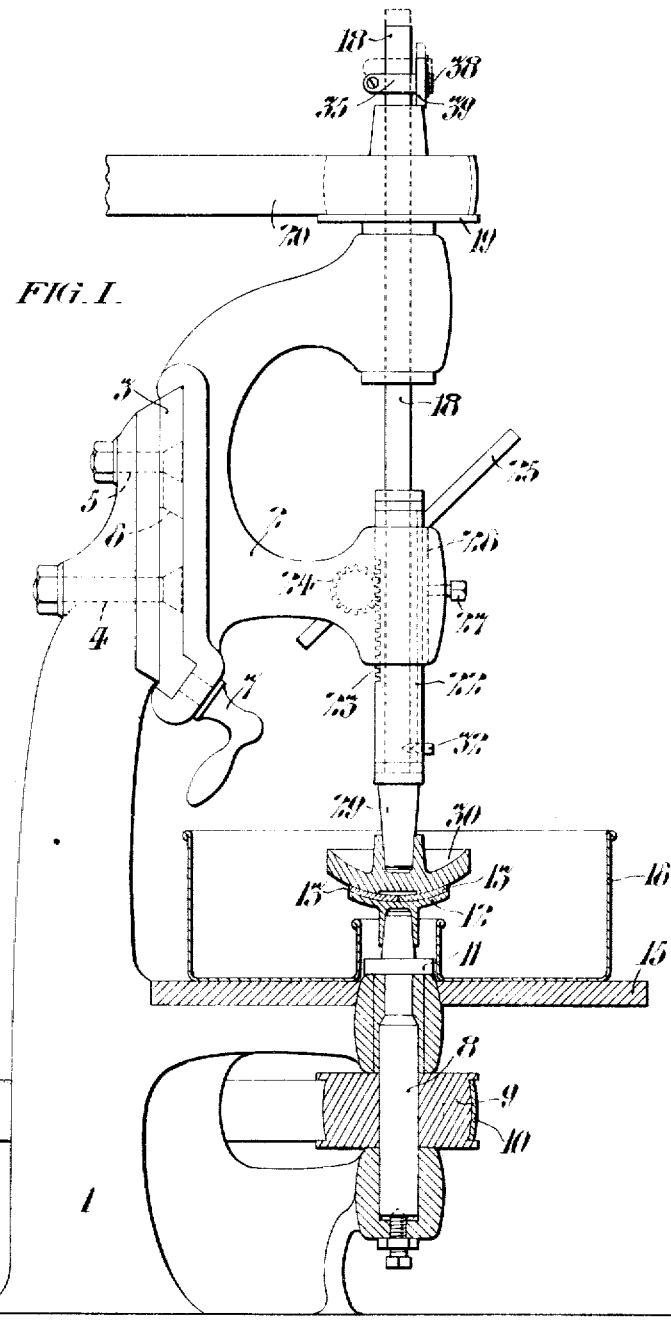

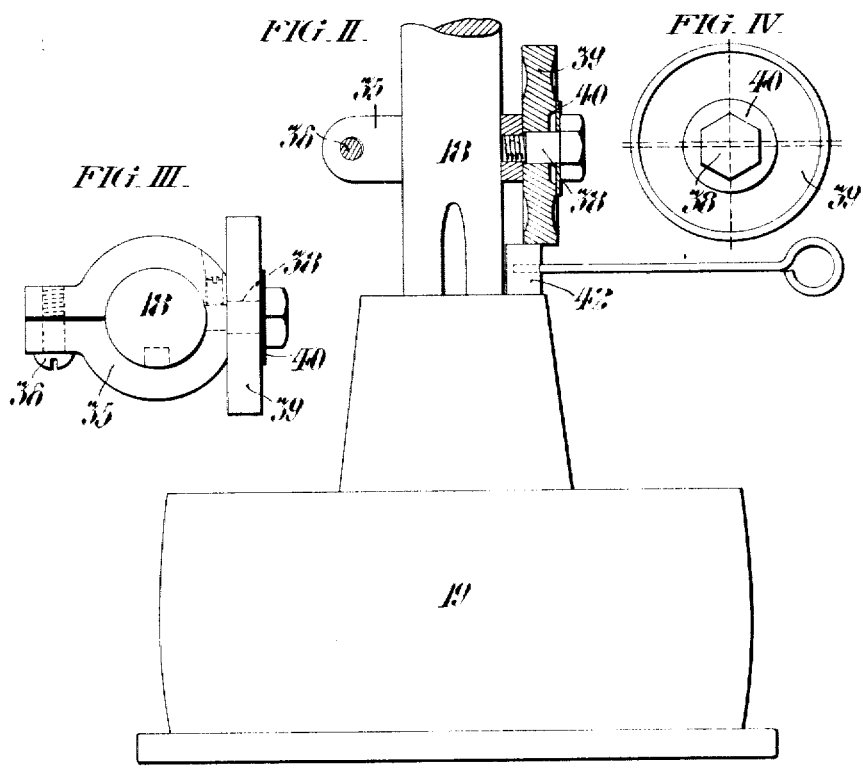
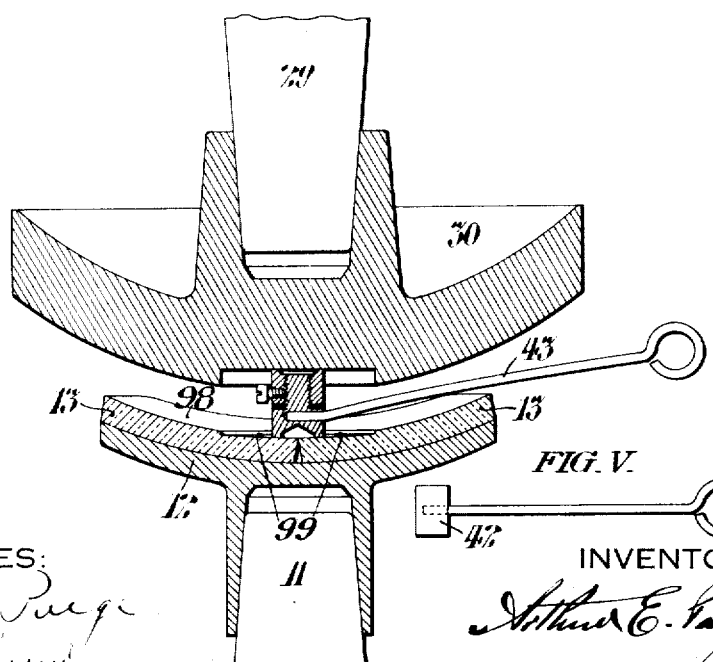

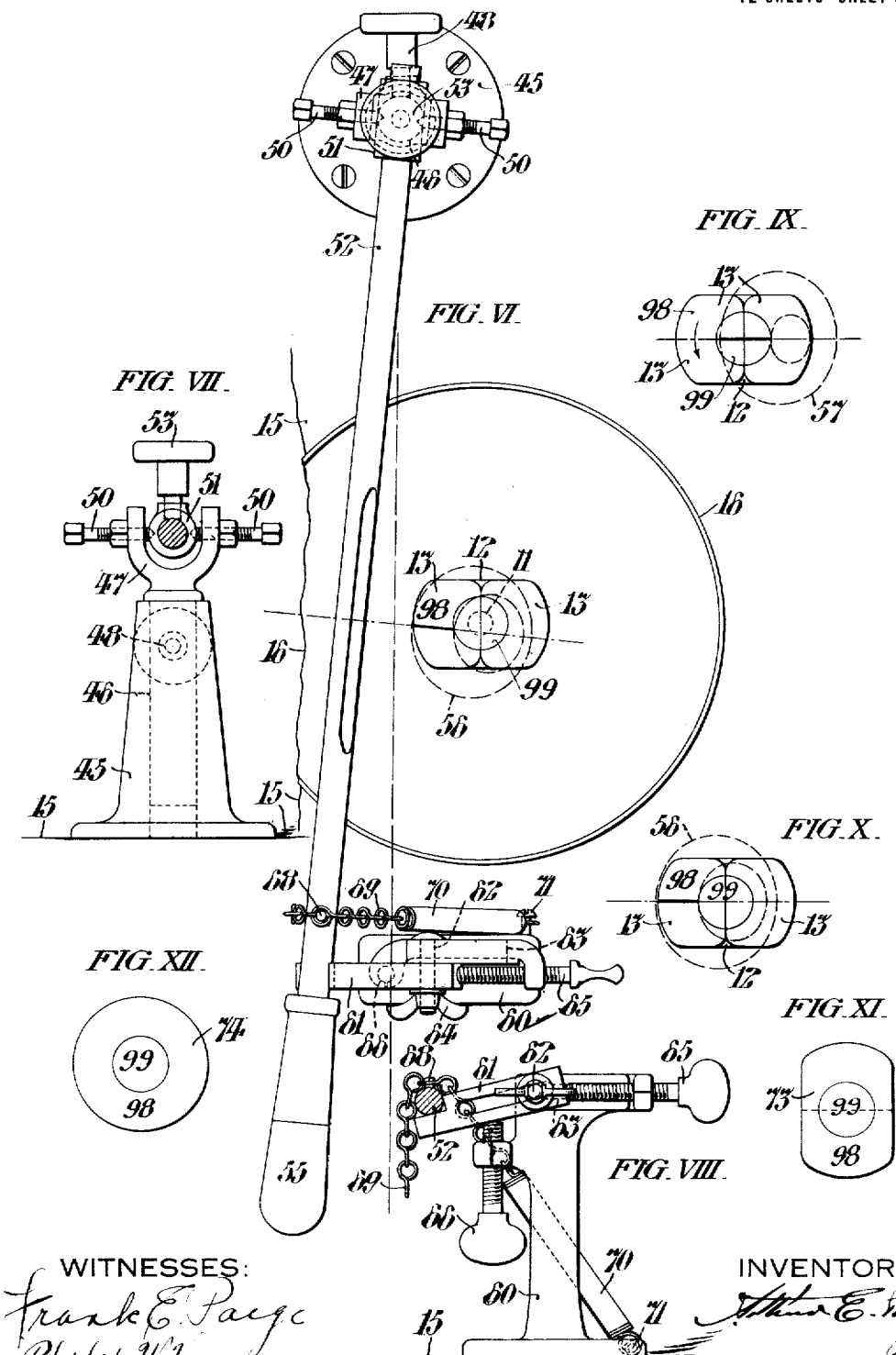

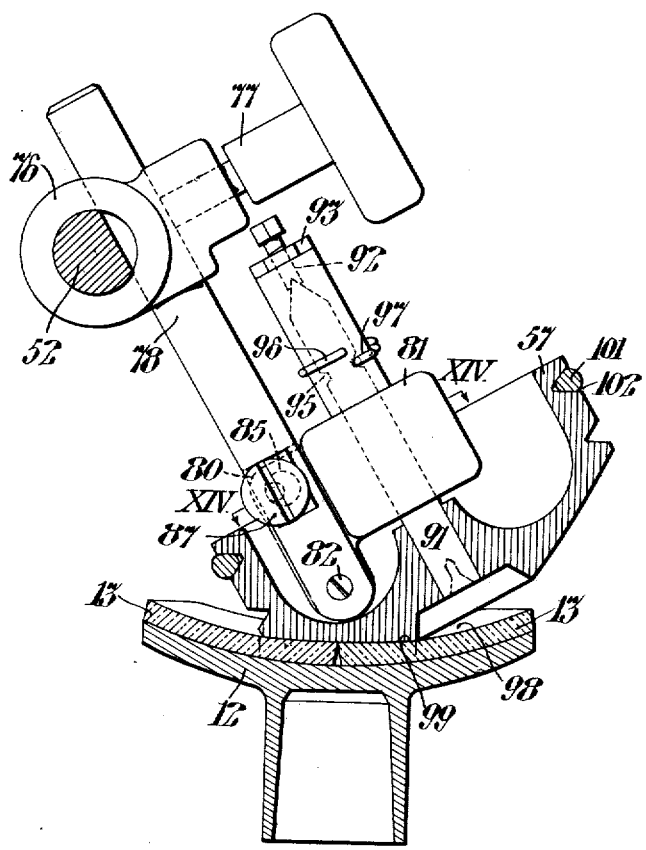
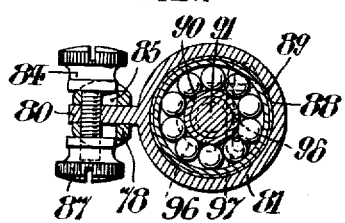

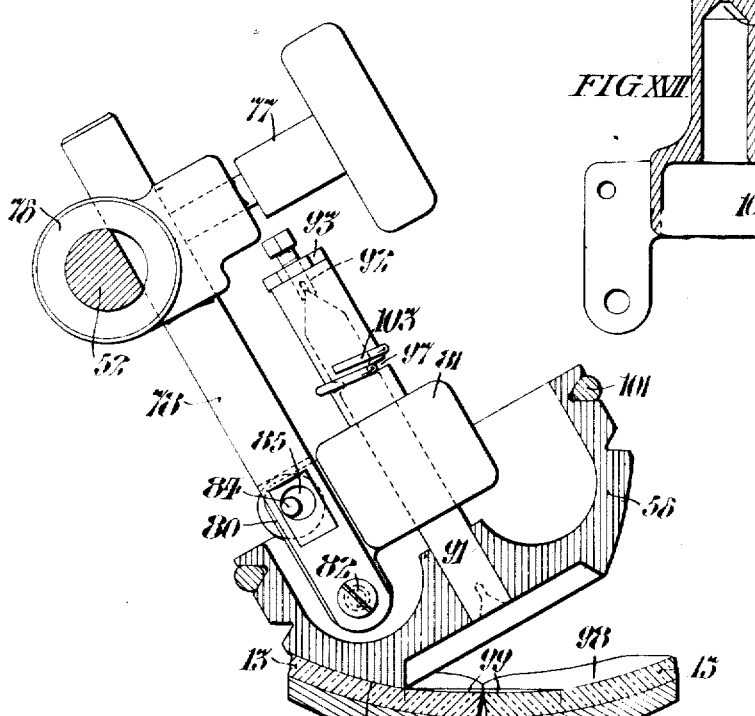

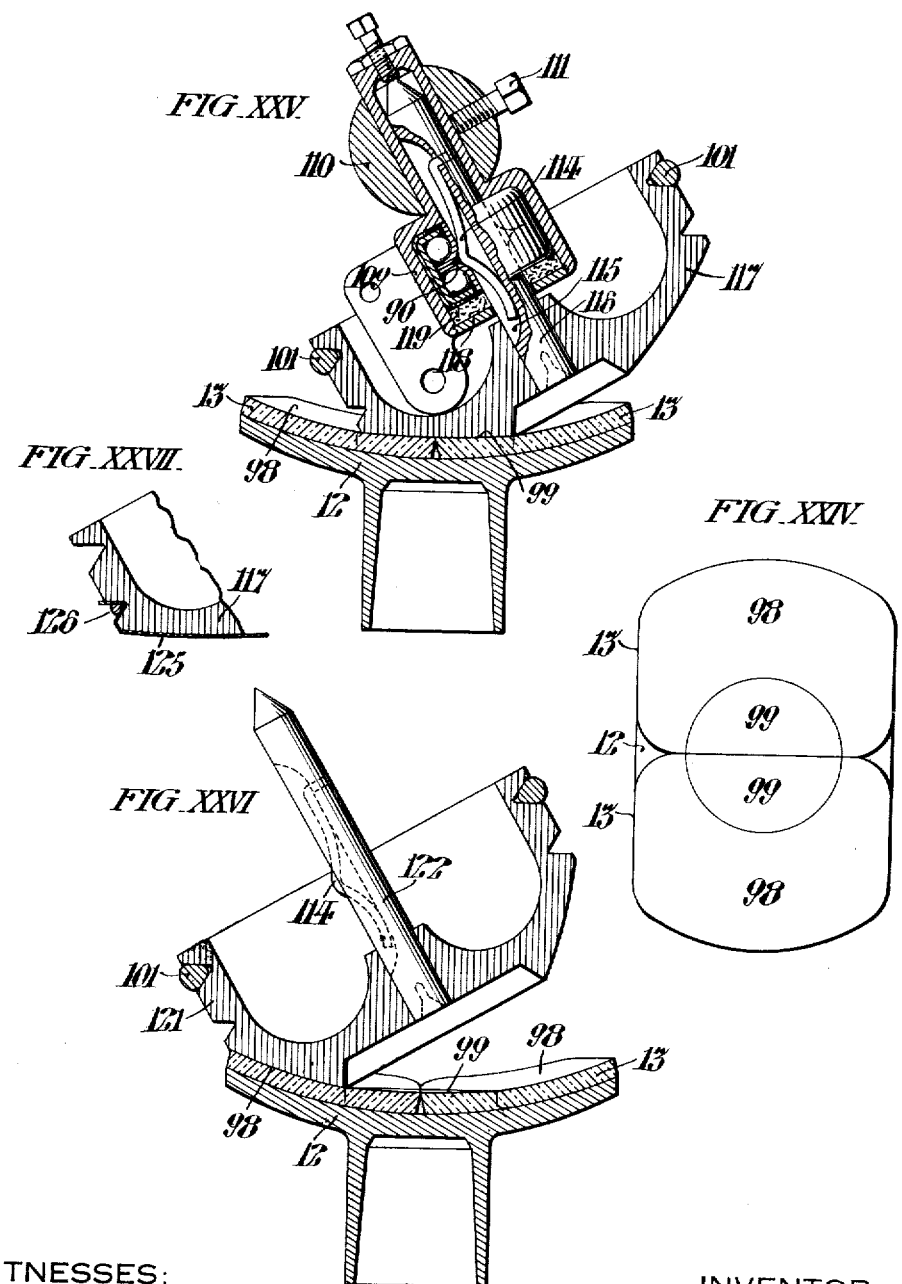

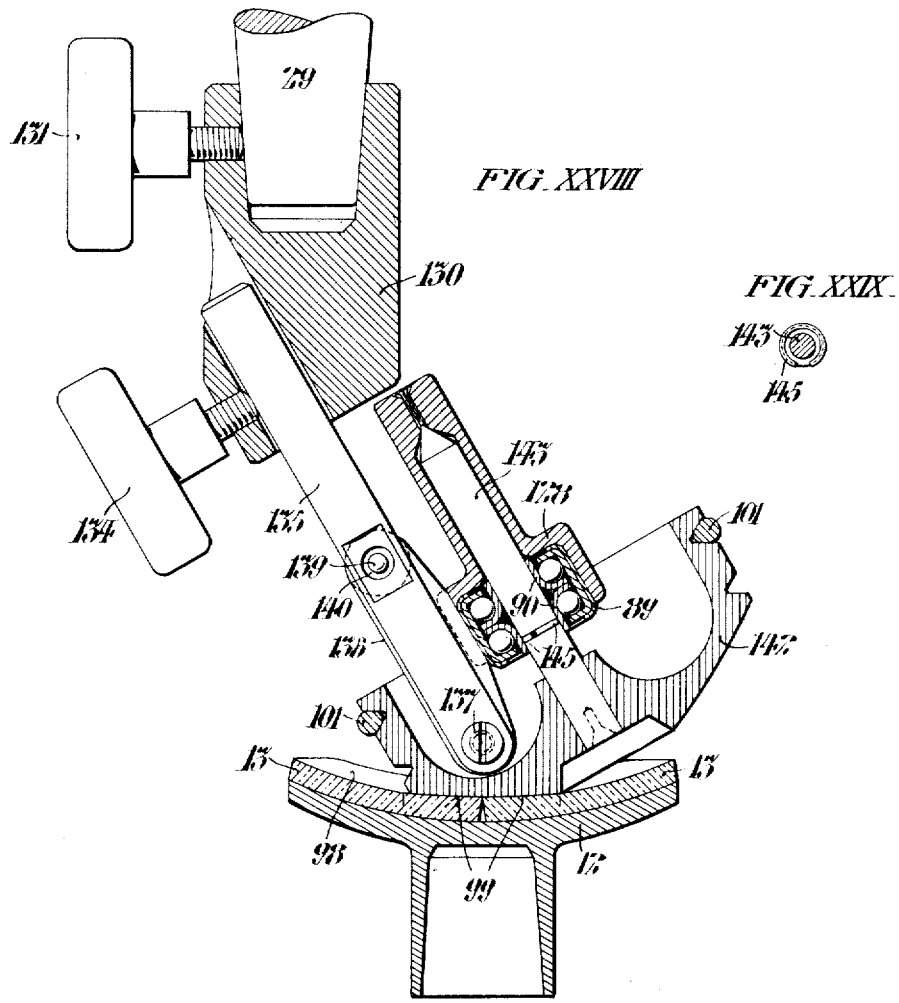

A. E. PAIGE.
MECHANISM FOR MAKING BIFOCAL LENSES.
APPLICATION FILED MAR. 4, 1915.
1,269,568.
Patented June 11, 1918.
12 SHEETS—SHEET 9.
FIG. XXXII.
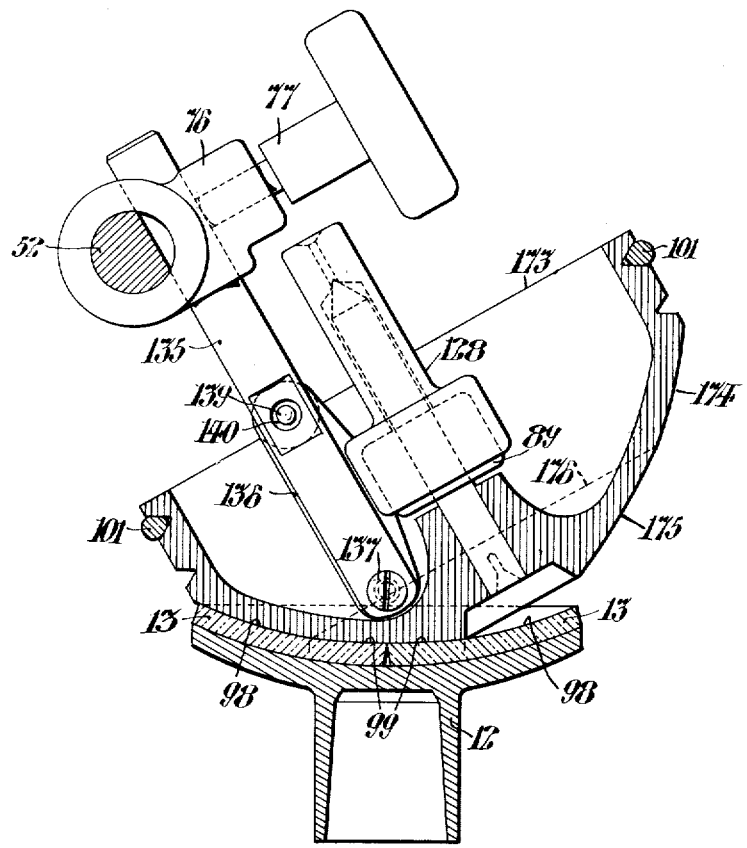
FIG. XXXIII.
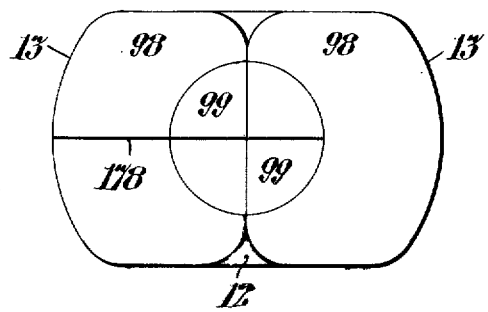
WITNESSES:
Frank E. Paige
Philip W. Vessey
INVENTOR:
Arthur E. Paige

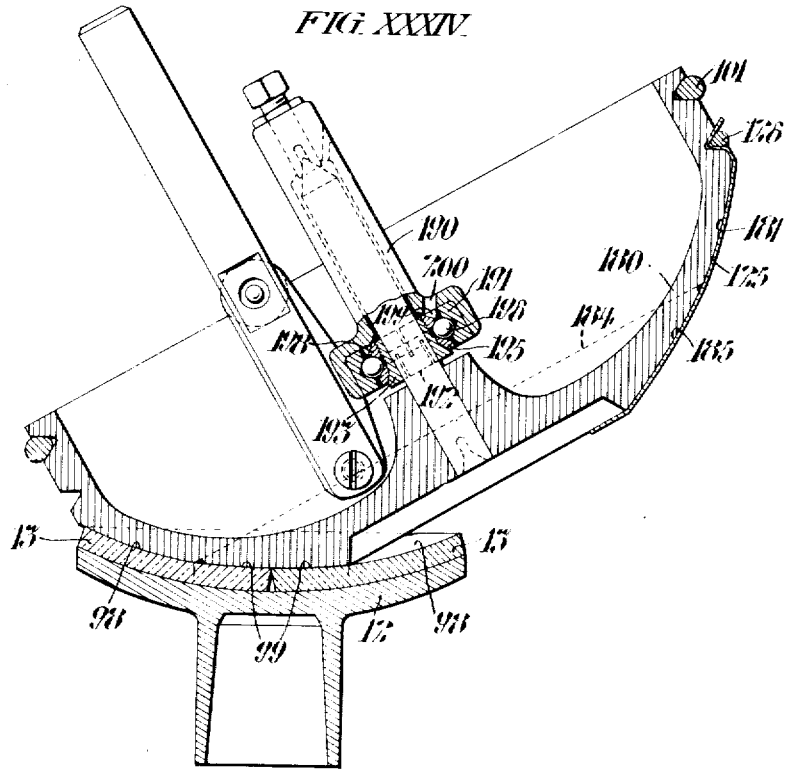

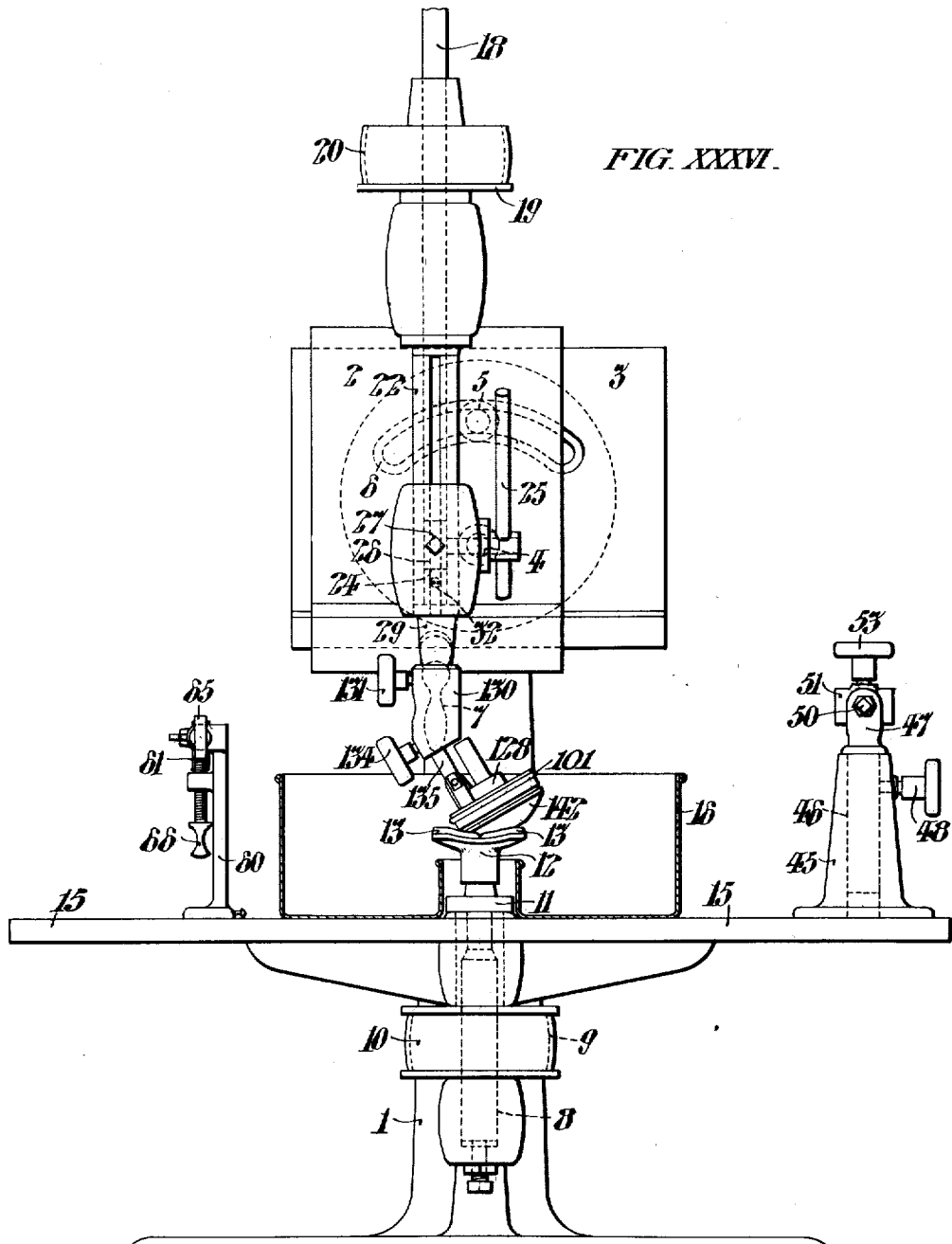

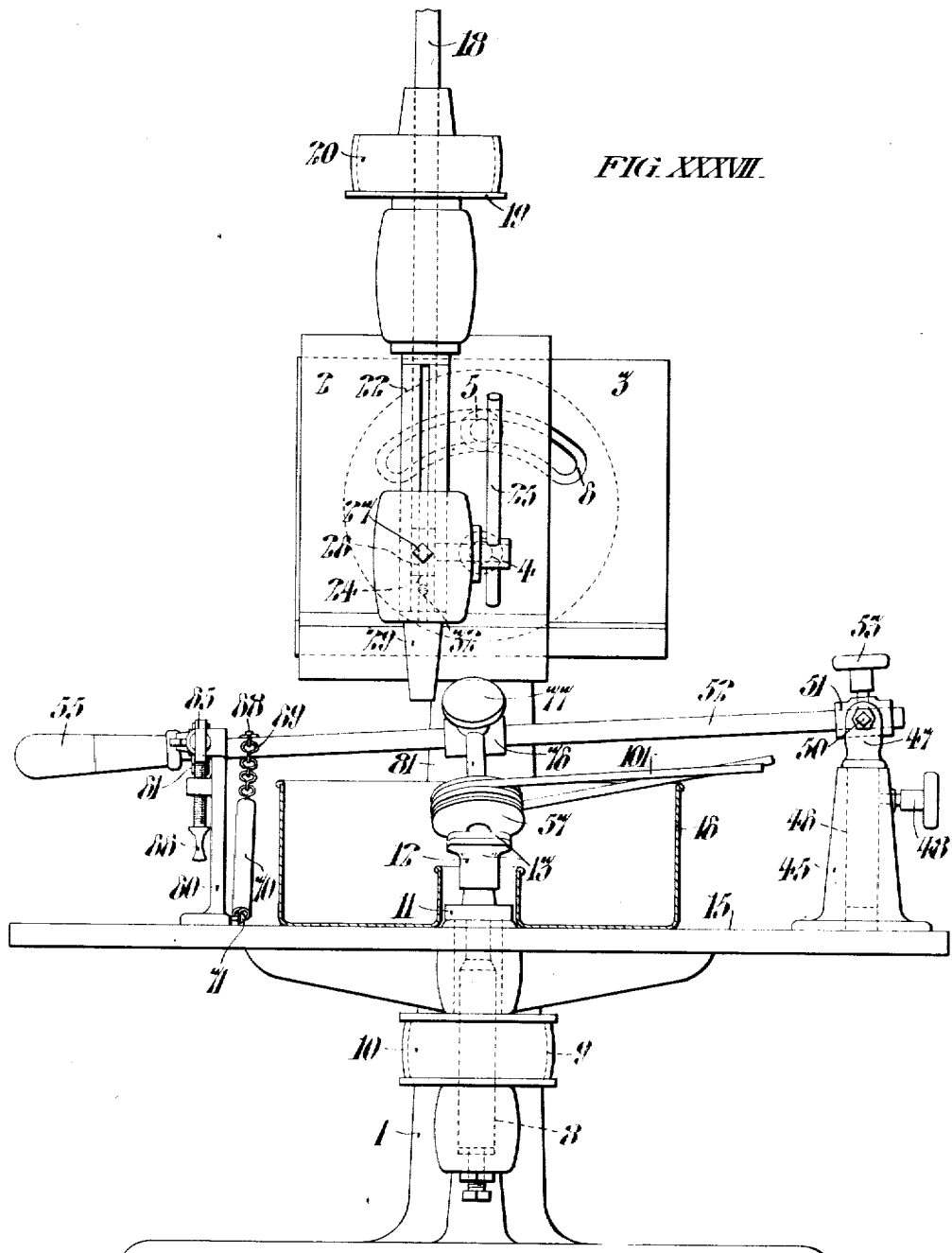

UNITED STATES PATENT OFFICE.

ARTHUR E. PAIGE, OF PHILADELPHIA, PENNSYLVANIA.

MECHANISM FOR MAKING BIFOCAL LENSES.

1,269,568.   Specification of Letters Patent.   Patented June 11, 1918.

Application filed March 4, 1915. Serial No. 12,028.

*To all whom it may concern:*

Be it known that I, ARTHUR E. PAIGE, a citizen of the United States, residing at Philadelphia, in the State of Pennsylvania, have invented a certain new and useful Improvement in Mechanism for Making Bifocal Lenses, whereof the following is a specification, reference being had to the accompanying drawings.

My invention relates to means for producing curved surfaces, and particularly such surfaces as adjoin each other and are respectively uniformly curved to the junction line between them, so as to sharply define the latter. As hereinafter described, such means are adapted to surface one side of glass to contemporaneously form a pair of bifocal lenses, the glass being held with the respective minor areas adjoining each other and between their respective major areas and concentrically rotated in coöperative relation with abrading means common to the glass which forms both members of such a pair. Such abrading means includes a lap having an annular abrading surface presenting only a transverse line of contact to the glass and having one circumferential edge of said annular surface presented tangentially to the junction line between the major and minor lens areas, so that that edge of the abrading surface extends obliquely over said junction line from its point of contact with the glass; whereby the blass is abraded in a direction obliquely transverse to said junction line, so as to sharply define the latter. As hereinafter described such oblique relation is determined by having the axes of rotation of the glass and of the lap neither at right angles nor parallel but in acutely oblique transverse relation, and, although the axis of rotation of the lap may be maintained in radial relation with the axis of rotation of the glass, and is preferably so maintained in abrading the minor lens surfaces, because the line of contact between the lap and the glass then intersects the center of rotation of the minor lens areas, the axis of rotation of the lap may extend tangentially to a circle described by rotation of any point on the surface of the glass, and is preferably thus maintained in abrading the major lens surfaces; because the path of the abrading material moved by the lap is then in a direction transverse to the path of the abrading material moved by the glass, thus imparting a compound decussative motion to said material and preventing it from forming concentric ruts or scratches in the glass. Moreover, by presenting the line of contact of the lap with the glass in tangential relation to a circle of rotation of the latter, a spherically curved surface of a given radius may be produced by a lap surface of less radius, which is advantageous in that such a lap may be adjusted to and from radial and tangential position to compensate for wear of its abrading surface. For instance, a lap having a concidal abrading surface which is arcually curved respectively differently transversely and circumferentially, when presenting a transverse line of contact to the glass in radial relation to the axis of rotation of the latter, produces a spherical surface of precisely the same radius as the transverse curvature of the lap surface, and, as the lap surface is rendered more convex by use, the line of contact may be shifted to tangential relation to a circle of rotation of the glass to produce a spherical surface of the given radius with the lap surface then of a less radius. Of course, such adjustment to and from radial and tangential position is limited to the extent of the radius of the circular perimeter of the minor lens areas.

My invention includes the various novel features of construction and arrangement hereinafter more definitely specified.

The method of surfacing herein described is claimed in my application Serial No. 30,716, filed May 27, 1915, as a division of this case, and the abrading tools herein described are claimed in my application Serial No. 32,259, filed June 5, 1915, as a division of this case.

In the drawings:—Figure I is an elevation, partly in section, of a surfacing machine embodying certain features of my invention.

Fig. II is a fragmentary view of parts of said machine, on a larger scale, showing means for precisely limiting the approach of the laps to the glass.

Fig. III is a plan view of the cam wheel and its supporting collar, forming part of said limiting means shown in Fig. II.

Fig. IV is a front view of said cam wheel.

Fig. V is a side elevation of the portable gage by which said cam wheel is set as shown in Fig. II.

Fig. VI is a fragmentary plan view of said machine, illustrating parts thereof which are not shown in Fig. I, including a lever having a universal fulcrum, by which lap elements of my invention may be adjustably supported; one of said lap elements being indicated in dash lines in position to present a transverse line of contact of its annular abrading surface, to the major lens surface of the glass which is to be abraded, and in tangential relation to a circle of rotation of said glass.

Fig. VII is an elevation of the universal fulcrum support for the lever shown in Fig. VI.

Fig. VIII is an elevation of the stop mechanism by which the movement of said lever is precisely limited.

Fig. IX is a diagrammatic plan view indicating, in dash lines, a lap having its annular abrading surface presenting a transverse line of contact to said glass, at the minor lens area of the latter and in radial relation with the axis of rotation of the glass.

Fig. X is a diagrammatic plan view, wherein the lap illustrated in Fig. VI, indicated in dash lines, is shifted to present its line of contact to the glass at the major lens surface of the latter and in radial relation with the axis of rotation of the glass.

Fig. XI is a plan view of a single piece of glass, forming a blank for a pair of bifocal lenses, of substantially the same shape as the pairs of lens blanks shown in Figs. VI, IX and X.

Fig. XII is a plan view of a circular piece of glass adapted to form a pair of bifocal lenses, by the employment of the means illustrated in the preceding figures.

Fig. XIII is a vertical sectional view of the lap, glass, and glass holder arranged to abrade the minor lens surfaces in accordance with Fig. IX, and illustrating means for supporting said lap in operative connection with the lever shown in Fig. VI; said supporting means being mounted upon the table of the machine shown in Figs. I and XXXVII and being capable of oscillatory adjustment in the plane of the radial line of contact of the lap with the glass.

Fig. XIV is a sectional view of the bearing for the lap spindle, taken on the line XIV, XIV in Fig. XIII, and indicating in dotted lines the means carried by the lap spindle bearing for resiliently engaging said spindle as in Fig. XIII, to prevent accidental axial displacement of the lap when the latter is raised from contact with the glass.

Fig. XV is a view similar to Fig. XIII but showing a lap arranged to abrade the major lens surfaces in accordance with Fig. X.

Fig. XVI is an upper end view of the lap spindle bearing and its pivot bar shown in Figs. XIII, XIV and XV.

Fig. XVII is a vertical sectional view of a simplified form of lap spindle bearing which may be substituted for that shown in Figs. XIII, XV and XVI.

Figs. XVIII, XIX and XX are diametrical sectional views of pairs of lens blanks such as indicated in Figs. VI, IX and X, illustrating successive steps in a method of surfacing the same. Fig. XVIII shows said blanks primarily surfaced to a uniform curvature throughout the entire area of their upper sides; the curve indicated being minus six diopters. Fig. XIX shows said blanks with their minor areas in the same condition as in Fig. XVIII but with their major areas further surfaced, at the same curvature, so as to leave the minor areas projecting upwardly therefrom. Fig. XX shows said pair of blanks with their minor areas surfaced to a curvature of four diopters.

Figs. XXI, XXII and XXIII respectively show inner edge views of respective individual members of the pairs of blanks shown in Figs. XVIII, XIX and XX.

Fig. XXIV is a plan view of a rotary glass holder with a pair of bifocal blanks thereon is in Figs. XIII, XV, XX and XXIII.

Fig. XXV is a vertical sectional view similar to Fig. XIII but showing a lap spindle bearing directly connected with a supporting lever, without the interposition of the bearing pivot bar shown in Fig. XIII, and with means carried by the spindle resiliently engaging said bearing and preventing accidental axial displacement of the lap.

Fig. XXVI is a sectional view similar to Fig. XV but showing a lap for abrading the major lens surfaces, provided with retaining means like the lap shown in Fig. XXV.

Fig. XXVII is a fragmentary sectional view of the lap shown in Fig. XXV, showing its abrading surface covered with a sheet of textile fabric secured by an elastic sphincteral band.

Fig. XXVIII is a vertical sectional view similar to Fig. XIII but showing the lap spindle bearing supported by a detachable coupling connecting it with the upper spindle of the machine shown in Fig. I; said spindle being rigidly connected with the vertically adjustable quill of said machine when thus used.

Fig. XXIX is a sectional view of the lap spindle shown in Fig. XXVIII, showing the normal construction and position of the resilient ring carried by said spindle, when the latter is withdrawn from the bearing shown in Fig. XXVIII.

Fig. XXX is a vertical sectional view showing laps adapted to respectively abrade the major and minor lens surfaces, mounted upon a common spindle, upon which they may be independently rotated at different speeds.

Fig. XXXI is a fragmentary sectional view of the laps shown in Fig. XXX, with their abrading surfaces covered by respective sheets of textile fabric secured by elastic sphincteral bands.

Fig. XXXII is a vertical sectional view, similar to Fig. XXX, but showing a single lap having the respectively differently curved annular abrading surfaces for abrading the major and minor lens surfaces.

Fig. XXXIII is a plan view similar to Fig. XXIV but showing that the contact between the lap and the glass arranged as in Fig. XXXII is only at a line, (which is shown radial with respect to the lap axis), because both of the annular surfaces of said lap are respectively differently curved transversely and circumferentially. If either of said surfaces was curved the same both transversely and circumferentially its contact with the glass would be broader than a mere line.

Fig. XXXIV is a vertical sectional view similar to Fig. XXXII but showing a lap having an annular abrading surface for the major lens surfaces which is spherically curved i. e., arcually curved the same both transversely and circumferentially, whereas, the annular abrading surface for the minor lens surfaces is arcually curved respectively differently transversely and circumferentially.

Fig. XXXV is a plan view similar to Fig. XXXIII but showing that whereas the annular abrading surface of the lap shown in Fig. XXXIV for abrading the minor lens surfaces presents only a line of contact to the glass, which is radial with respect to the lap axis; the annular abrading surface of said lap for the major lens surfaces presents an area of contact to the glass which is a lune of a spherical surface.

Fig. XXXVI is an elevation of the machine shown in Fig. I, looking toward the left in that figure, but with the upper and lower spindles in the position contemplated in Fig. XXVIII.

Fig. XXXVII is a view similar to Fig. XXXVI but showing a lever lap support and its appurtenances as in Fig. XIII.

Fig. I illustrates a machine which may be conveniently employed in roughing glass blanks, by rotating them and a lap upon a common axis but respectively different spindles which are, preferably, rotated in opposite directions so as to attain the maximum speed of grinding with the minimum centrifugal discharge of the abrading material. However, it is to be understood that other means may be employed to effect the grinding of the blanks preliminary to the employment of the laps which have their axes extending obliquely with respect to the axis of rotation of the glass as herein set forth.

In Fig. I, the machine frame comprises the stationary base 1 and the slide frame 2 which is a lever tiltable and capable of straight lateral movement thereon. The guide plate 3 is a lever which may be tilted on the bolt 4 and secured by tightening that bolt and the bolt 5 which extends through the arcual slot 6 in said plate 3. Said guide plate 3 engages the undercut flanges of said frame 2 and may be secured in adjusted position thereon by the set screw 7.

The lower spindle 8 is journaled in said base frame 1 and has the pulley 9 for rotation by the belt 10, and has the conical cap 11 for detachable engagement with the glass holder 12 upon which the lens blanks 13 are detachably mounted, conveniently with pitch cement. Said base 1 also supports the table 15 upon which the pan 16 is removably supported in concentric relation with said spindle 8. The upper spindle 18 is journaled in said frame 2 and provided with the pulley 19 and belt 20 by which it may be rotated. Said pulley 19 is keyed to said spindle 18 so that the latter may be raised and lowered through it by means of the quill 22 having the rack teeth 23 engaging the gear 24 which may be turned by the handle 25. Said quill is prevented from rotating by the key 26 which is conveniently wedge shaped radially with respect to the spindle 18 and adjustable by the set screw 27 so that said quill is prevented from turning in said frame 2. Said spindle 18 has at its lower end the conical cap 29 for detachable engagement, directly, with the lap 30 which may be rotated in axial alinement with the spindle 8 when the set screw 32 in the quill is retracted. However, it may be observed that the above described construction and arrangement of said frame 2 and plate 3 is such that they form a compound lever, so adjustable with respect to the axis of said bolt 4, as their common fulcrum, that the axis of said spindle 18 may be caused to extend in alinement with the axis of said spindle 8; or parallel therewith, in spaced relation; or with said axes, of spindles 8 and 18, intersecting at any desired radius with respect to the surface which is to be abraded; but said axes are maintained in a common plane throughout the range of such adjustment. Therefore, said spindle 18 cannot serve to transmit rotary motion from said belt 20 to the rotary laps hereinafter described, when their axes of rotation must be presented in any other plane; but when said spindle 18 is prevented from rotating by the insertion of said screw 32, which clamps it rigidly in the quill 22, it may be used to support the other laps hereinafter described, as shown in Fig. XXVIII, to precisely determine the approach thereof to the glass. It may be observed that in Fig. XXVIII the cap 29 of said spindle 18 is not in axial alinement with the glass holder 12; such offset relation being attained by lateral sliding movement of the frame 2 on the plate 3 shown in Fig. I. In either case, the approach of the lap carried by the spindle 18 to the glass carried by the holder 12 may be precisely predetermined and limited by the adjustment of the parts shown in detail in Figs. II to V inclusive.

Referring to Figs. II to V inclusive; said upper spindle 18 is provided with the split collar 35 which is adjustable longitudinally on said spindle 18 but may be rigidly clamped thereon by the screw 36. Said collar 35 is provided with the screw stud 38 carrying the cam wheel 39 which is frictionally engaged by the spring washer 40 which prevents its accidental rotation but permits it to be turned by hand. Said cam wheel 39 may be set in precisely predetermined spaced relation with the hub of said pulley 19 by means of the gage 42 which is conveniently a wire handle provided with a cylindrical head but which may be of any other convenient construction capable of interposing a definite thickness between said hub and wheel as exemplified in Fig. II. Said gage 42 is used in conjunction with the gage 43 which is interposed between the proximal faces of the lap 30 and the glass which it is to abrade; said gage 43 having a cylindrical head formed in two sections which are relatively adjustable to vary the length of said head, so that the relation between the lengths of the heads of said gages 42 and 43 is such that when the cam wheel 39 is set in contact with the gage 42, with the gage 43 in contact with the lap 30 and the glass 13 and both gages then removed, the space between the lower edge of said cam wheel 39 and the upper end of the hub on said pulley 19 is precisely the distance that the lap 30 should be allowed to approach the glass to grind the surfaces thereof to the proper extent. It may be observed that the length of the head of said gage 43 need not be varied except to compensate for changes in the proximal face of the lap 30 incident to the wear and reshaping of the latter.

It may be observed that the construction and arrangement including said cam wheel 39 may be broadly characterized as means for precisely predetermining and limiting the approach, to the glass 13, of the tools 30, etc., by which the glass is abraded, and is thus defined in the appended claims.

Referring in Figs. VI to VIII inclusive, it is to be understood that the universal fulcrum support and the stop mechanism for the lever shown in Fig. VI are mounted upon said table 15 upon which said pan 16 rests. As shown in Fig. VII said fulcrum support includes the socket base 45 in which the cylindrical shank 46 of the yoke 47 may be turned and vertically adjusted, and clamped by the set screw 48 when in adjusted position; said set screw 48 being in screw threaded engagement with said base 45. Said yoke 47 has the oppositely alined cone pointed screws 50 engaging the sleeve 51 in which the lever 52 may be turned and longitudinally adjusted, and clamped in adjusted position by the set screw 53 which is in screw threaded engagement with said sleeve. However, it may be observed that when said parts are adjusted and clamped by the screws 48 and 53, said lever 52 is free to oscillate in a vertical plane upon the common axis of said screws 50, and said lever is conveniently provided with the handle 55 by which it may be manipulated as a convenient support by which the laps 56 and 57, indicated in dash lines in Figs. VI, IX and X, may be presented in operative relation with the pairs of lens blanks 13 supported and rotated by the holders 12 on the spindle cap 11.

Although when clamped by the screws 48 and 53, said lever 52 is ostensibly prevented from moving except in a vertical plane; it is practically impossible to make it so rigid that it cannot be otherwise moved within the limit of its resilience, and, in fact, it may be bent and twisted, without permanent distortion, when clamped by the supporting means above described, to such a degree that I find it convenient to provide stop mechanism at the handle end of said lever by which its movement may be precisely limited as indicated in Figs. VI and VIII wherein the stop bracket 60, which is conveniently mounted upon said table 15, carries the stop block 61 upon the bolt 62 which has a squared shank mounted to slide in the slot 63 in said bracket and is provided with the wing nut 64 by which said block 61 may be secured in any position of adjustment to which it may be shifted by the thumb screws 65 and 66 which are in screw threaded engagement with said bracket 60. Said lever is conveniently provided with the stud 68 which may be selectively engaged with any link of the chain 69 at the upper end of the spring 70 which is connected with said bracket 60, at its lower end, by the screw 71, and it is to be understood that the approach of the laps 56 and 57 to the glass, both laterally and vertically, is precisely predetermined and limited by the location of said stop block 61. For instance, said lever may be set to present a lap in position to abrade the glass carried by the holder 12 and with a space between the lower side of said lever and the proximate upper surface of the recessed end of said block 61 corresponding with the thickness of the glass which is to be removed, and, said spring 70 being connected with said lever 52 as above described, the abrading operation may proceed without further attention of the operator except as to the maintenance of the proper quantity of abrading material and water or other liquid vehicle between the lap and the glass; the abrading action of the lap being terminated when the lever is lowered into contact with the subjacent recessed portion of said block 61 by the automatic action of said spring 70.

It is to be understood that although I have shown the glass upon the holders 12 in the form of individual lens blanks 13, other forms may be employed with equal facility, for instance, a single piece of glass 73, shown in Fig. XI, of the outer configuration of the holder 12, may be suitably surfaced and subsequently cut apart, on the dotted diametrical line shown in Fig. XI, to form a pair of bifocal lenses. Moreover, a circular glass blank 74 such as shown in Fig. XII may be thus surfaced and subsequently cut apart, upon any diametrical line to form a pair of bifocal lenses. Said form 74 is advantageous in that defects due to accidental crumbling of the glass may be avoided in cutting the lenses, and said form 73 is advantageous in that only the minimum amount of glass is required for the same.

Fig. XIII illustrates the lap 57, glass 13 and glass holder 12 arranged to abrade the minor lens surfaces in accordance with Fig. IX; said lap being supported in operative connection with said lever 52, (which is arranged as shown in Fig. VI,) by means capable of oscillatory adjustment in the plane of the radial line of contact of the lap with the glass. Such means includes the coupling 76 which is longitudinally adjustable on said lever 52 and has the set screw 77 by which the pivot bar 78 may be rigidly clamped against the flattened side of said lever in any position of adjustment; said bar 78 having its opposite sides flattened as shown in Fig. XIV. Said bar 78 is bifurcated at its lower end, as shown in Fig. XIV, to receive the radial flange 80 of the spindle bearing casing 81, which is a lever pivotally connected to said bar 78 by the fulcrum screw 82 which has a smooth cylindrical portion extending through said flange 80 but is in screw threaded engagement with said bar 78, as indicated in dotted lines in Fig. XVI. It may be observed that the construction and arrangement of said screw 82 is such that it may be slightly retracted to permit said lever flange 80 to oscillate freely and be advanced to clamp said flange between the bifurcations of said bar 78. The oscillatory movement of said flange 80 in said bar 78 is limited and the parts clamped in adjusted relation by the screw 84 which extends freely through the openings 85 in said bar but is in threaded engagement with said flange 80 as shown in Fig. XIV. Said screw 84 may be jammed in adjusted position by the nut 87 shown in Fig. XIV.

Said lap spindle bearing casing 81 carries in its socket 88, a ball bearing which is conveniently constructed and arranged as shown in Fig. XIV, including the outer shell 89 which is tightly but detachably fitted in said casing 81, so that it may be removed and replaced when worn. Said ball bearing includes the sleeve 90 through which the spindle 91 of the lap 57 may be slid to and from its operative position shown in Fig. XIII, without lateral lost motion. In operative position the upper cone point of said lap spindle is seated in the cone socket screw 92, which is axially adjustable in screw threaded engagement with said casing 81 and is provided with the nut 93 by which it may be secured in adjusted position.

To prevent accidental displacement of said lap 57 when it is raised from contact with the glass, by the lever 52, I find it convenient to provide said spindle 91 with a circumferential groove 95 to receive the latch spring 96 which is carried by the casing 81 and has one limb extending in the slot 97 in the latter in registry with said groove. The construction and arrangement of said resilient retaining means is such that it yields to permit said lap to be manually shifted to and from its operative position in said casing 81.

It may be observed that in the position shown in Figs. IX and XIII, said lap 57 is so set that the smaller circumferential edge of its abrading surface, which is in contact with the glass 13, is tangential to the circular junction line between the major lens areas 98 and the minor lens areas 99. Said junction line is indicated in Fig. XIII and in other sectional views of the glass, by short straight lines which extend vertically downwardly from the upper surface of the glass, but which are not intended to indicate any division in the glass, but merely to indicate the position of the laps with reference to said junction lines which are otherwise difficult to locate in the sectional views in view of the slight difference in curvature between the adjoining surfaces. It may be observed with reference to Fig. XIII that said smaller circumferential edge of the abrading surface of the lap 57 extends obliquely over said junction line from its point of contact with the glass; whereby the glass is abraded by said lap in a direction transverse to said junction line, so as to sharply define the latter; the glass being slowly rotated in the direction of the arrow in Fig. IX while the lap is rotated in the same direction. Although said lap may be caused to rotate in that direction merely by frictional engagement with the surface of the glass rotating in that direction, I find it preferable to rotate the lap at a much higher speed than the glass and this may be conveniently done by the belt 101 engaging the groove 102 in the lap as shown in Fig. XIII and extending thence around any suitable driving pulley. The reason for rotating the glass, is, of course, to successively present to the line of contact with the lap all of the area of the glass which is to be abraded by the latter. The reason for rotating the lap at a higher speed is to attain the maximum relative movement of the lap and glass surfaces which is possible with the employment of a pulverulent abrading medium; such speed being limited by the centrifugal effect upon said material, for, if the lap is rotated at too great a speed said material will be thrown off the glass upon which it must be retained to have any abrading effect. The reason for rotating the lap in the same direction as the glass is to minimize the chance of producing scratches by irregular particles of the abrading material which might be retained in damaging relation to the glass if the glass and lap are rotated in opposite directions, as the abrading material is then piled up by the opposite feeding movement thereof by the glass and lap.

It is to be noted that the abrasion is not effected by the surface of the lap but by the pulverulent abrading material which is free to move between the adjacent surfaces of the lap and glass, and has a motion which is the resultant not only of the circular rotation of the lap and glass with their axes in the oblique relation described, but of the so called centrifugal force generated by such movement; the effect of said force being always to produce a tangential motion of each particle of the abrading material, outwardly with respect to the axis of rotation of the element supporting said particle at any instant. That the glass is abraded in a direction transverse to said junction line is clearly indicated by the score marks made in the glass by granules of the abrading material. The expression "obliquely transverse" is employed to indicate the contemplated direction more precisely than is indicated by the word "transverse" alone, which is comprehensive of the right angular relation as distinguished from the diagonal or oblique crossing movement contemplated, which is the result of the traverse of the particles of the abrading material in evolute paths, under the several forces acting upon them as aforesaid.

Fig. XV illustrates the lap 56, glass 13 and glass holder 12 arranged to abrade the major lens surfaces in accordance with Fig. X; said lap being supported in operative connection with said lever 52 by the same means, capable of oscillatory adjustment in the plane of the radial line of contact of the lap with the glass, as shown in Fig. XIII, except that different resilient means 103 is shown fitting said notch 97 in the casing 81 in said Fig. XV, and also in Fig. XVI, to prevent accidental displacement of the lap spindle. Of course, said lever 52, as shown in Fig. XV, is set in a different position from that it occupies in Fig. XIII, in order to present the annular abrading surface of said lap 56 in operative relation with the major lens surfaces of the glass 13.

The dash line which is radial to the center of oscillation of said lever 52 in Fig. VI indicates its position when supporting the lap 57, as in Figs. IX and XIII. The position of said lever shown in full lines in Fig. VI is approximately that which it occupies when supporting said lap 56 as shown in Figs. X and XV, it being shifted slightly more to the left, to bring the smaller circumferential line of its annular abrading surface tangential to the circle defining the minor lens areas in Figs. VI and X.

Fig. XVII is a vertical sectional view of a spindle bearing casing 105 which is similar to said casing 81 but of simpler construction in that it has no pivot screw or nut at the upper end thereof; its cone socket 106 being adapted to receive the conical points of the lap spindles and hold them in concentric relation with said casing and the ball bearing which is detachably but tightly fitted in the socket 107 at the lower end thereof.

I find it convenient to prepare the glass for abrasion by the conoidal laps 56 and 57 above described by primarily surfacing the blanks to a uniform curvature throughout the entire area of their upper sides, for instance, as shown in Figs. XVIII and XXI where the upper sides of the blanks 13 are surfaced to a curvature of minus six diopters. Then, either the minor areas may be further surfaced to the desired curvature, thus reducing them to a less thickness than the major areas, as shown in Fig. II, or, the major areas may be further surfaced to the proper curvature reducing them to less thickness than the minor areas, as shown in Figs. XIX and XXII. In either case, such surfacing is conveniently effected by the mechanism shown in Figs. I to V inclusive, and, although for convenience of illustration I have shown the laps in Figs. I and II with their axes coincident with the axes of the glass holders, and the glass may be thus concentrically ground, such concentric grinding must be carefully done to prevent the formation of concentric scratches in the glass. Therefore, I prefer to effect such preliminary surfacing with the axes of rotation of the laps slightly eccentric to the axis of rotation of the glass, at the surface of the latter being abraded, although radial with respect to the center of curvature of that surface, to thus make it impossible to produce concentric scratches in the glass. Such adjustment of the machine shown in Fig. I may be readily effected by the means above described. In either case, the glass may be finally surfaced as shown in Figs. XX, XXIII and XXIV by the conoidal laps 56 and 57 above described, or laps of similar construction hereinafter described.

Fig. XXV is a vertical sectional view similar to Fig. XIII, but showing a lap spindle bearing casing 109 directly connected with a lever 110 with which it may be rigidly connected by the set screw 111. Said lever 110 may be conveniently supported, adjusted and set like the lever 52 above described. Said casing 109 incloses a ball bearing similar to those shown in Figs. XIV and XXVIII including a sleeve 90 having an annular recess which is adapted to detachably engage the spring 114 which is seated in the slot 115 of the spindle 116 of the lap 117. Said spring has its upper end rigidly connected with said spindle 115 but is free to resiliently oscillate radially with respect to said spindle and normally projects therefrom to the extent indicated in Fig. XXVI. Said bearing casing 109 is conveniently provided with the screw cap plate 118 at its lower end to retain the felt washer 119, through which said spindle is inserted and removed, so as to automatically wipe and oil said spindle each time it is inserted. Said lap 117 is otherwise constructed like the lap 57 and adapted to abrade the minor lens surfaces in accordance with Fig. IX.

Fig. XXVI shows a lap 121 having its spindle 122 provided with a spring 114 like the lap 117 but being otherwise constructed like the lap 56 above described and adapted to abrade the maj_ _ens surfaces in accordance with Fig. X.

Said laps 117 and 121 are adapted to fit any of the lap spindle bearings shown in the drawings and it may be observed that their springs 114 constitute resilient means for preventing their axial displacement when said laps are raised from the operative positions in which they are respectively shown in Figs. XXV and XXVI. Said laps 117 and 121 may be conveniently rotated by said belt 101, engaged therewith as shown, and it is to be understood that any of said laps may be provided with a cover of textile fabric or other flexible sheet material 125 retained thereon by the elastic sphincteral band 126 as shown in Fig. XXVII; such coverings serving as vehicles to retain the pulverulent abrading material upon the abrading surfaces of the laps.

Fig. XXVIII is a vertical sectional view similar to Fig. XIII but showing the lap spindle bearing casing 128 supported by a detachable coupling 130 connecting it with the cap 29 of the upper spindle 18 of the machine shown in Figs. I and XXXVI; the upper and lower spindles of said machine being in the position shown in Fig. XXXVI, and said spindle 18 being rigidly connected with the vertically adjustable quill 22 when thus used. Said coupling 130 has the set screw 131 for securing it in adjusted position upon said cap 29, so that said coupling may be turned to present the axis of the lap spindle in a plane which is radial to the axis of rotation of the glass holder 12 or in tangential relation to a circle described by rotation of any point on the surface of the glass as above contemplated. Said coupling 130 also has the set screw 134 by which the pivot bar 135 may be rigidly held in adjusted position; said bar being constructed and arranged like the bar 78 above described, i. e., it is bifurcated at its lower end to receive the radial flange 136 of the spindle bearing casing 128, which is pivotally connected therewith by the screw 137 which has a smooth cylindrical portion extending through said flange 136 but is in screw threaded engagement with said bar 135. The oscillatory movement of said flange 136 in said bar 135 is limited and the parts clamped in adjusted relation by the screw 139 which extends freely through the openings 140 in said bar but is in threaded engagement with said flange 136, like said screw 84 above described.

Said lap spindle bearing casing 128 carries a ball bearing including an outer shell 89 tightly fitted in said casing 128 and a sleeve 90 rotatable in said casing, and the lap 142, which is otherwise constructed and arranged like the lap 57 above described, has its spindle 143 provided with different means for preventing accidental axial displacement of the lap, including the resilient ring 145 which, as shown in Fig. XXIX, is normally of slightly larger diameter than said spindle but is compressed to frictionally engage said sleeve 90, as shown in Fig. XXVIII, when said spindle is thrust through said sleeve 90 into the operative position shown in said figure.

Of course, said tool 142 is thus adapted to rotate upon its own axis, and as said spindle 18, which carries it, is also rotary, a planetary movement may be thus imparted to said tool 142 when it is presented to the glass 13 upon the holder 12, when the spindles 8 and 18 are presented in axial alinement as in Fig. I. In that case, said tool 142 abrades an annular path upon the glass, in concentric relation with the axis of rotation of the glass but in eccentric relation to the axis of rotation of said tool upon its axis in said bearing casing 128; leaving the central circular area 99 of said glass unabraded by said tool 142; said unabraded area of the glass being, of course, concentric with the axis of rotation of the latter. Such arrangement and operation may be advantageously employed in the production of bifocal lens blanks in which the minor lens field 99 is in concentric relation with the major lens field 98, as indicated, for instance, in Fig. XII. Moreover, by thus supporting a surfacing tool upon the rotary spindle 18 so as to rotate upon an axis eccentric to the axis of said spindle, as above described, toric surfaces may be generated.

It may be observed that the axis of the rotary lap 30, shown in Fig. I, may be inclined transversely to the axis of rotation of the blanks 13 by turning the lever plate 3 upon its fulcrum 4 and thus inclining the slide frame 2, with respect to the stationary base 1; but such adjustment is limited to the single plane in which both the axes of said tool and blanks extend. However, a rotary lap may have its axis inclined transversely to the axis of rotation of said blanks and not extending in any plane including the axis of rotation of said blanks, if the lap supporting cap 29 of the shaft 18 in Fig. I be provided with said detachable coupling 130; or if the rotary lap be supported by the lever 52 shown in Fig. VI, instead of by the lever plate 3 shown in Fig. I; because the adjustment of said lever 52 is not limited to a single vertical plane as is the lever plate 3 aforesaid, but is also capable of adjustment transversely to such plane. For instance, the expression used in the appended claims "including a rotary lap having its axis inclined transversely with respect to the axis of rotation of said blanks;" would include both of the arrangements shown respectively in Figs. X and VI; but, the expression "a rotary lap having its axis inclined transversely to the axis of rotation of said blanks and not extending in any plane including the axis of rotation of said blanks" would exclude the arrangement shown in Fig. X, but include the arrangement shown in Fig. VI, where the axis of the lap extends transversely to the axis of the blanks, but in a different plane, as distinguished from the arrangement in Fig. X where the axis of the lap extends transversely to the axis of rotation of the blanks in a plane which is common to both axes.

Moreover, in view of the language of the appended claims; it may be observed that although the rotatable grinding tools 56 and 57 are respectively constructed and arranged to generate spherical surfaces of respectively different radii; neither of them has any grinding surface which is itself spherical. On the contrary, the grinding surface of each of said tools, which is located at a distance from its axis of rotation, as shown in the respective illustrations thereof, has its radial curvature, in any radial plane, an arc of a circle, the center of which is eccentric with respect to the axis of rotation of the tool. That is to say; the center of the circular arc of the radial curvature of the rotary grinding tool 57, shown in Fig. XIII, in contact with the blank 13, is eccentric with respect to its axis of rotation which is, of course, the axis of its spindle 91, and in fact, said center is necessarily located upon the axis of rotation of the blanks 13 and, similarly, the center of the circular arc of the radial curvature of the rotary grinding tool 66 shown in Fig. XV, in contact with the blank 13, is eccentric with respect to its axis of rotation which is, of course, the axis of its spindle 91, and, in fact, said center is necessarily located upon the axis of rotation of the blanks 13; although, as before noted, the radii of said circular arc curvatures are of respectively different extent.

Although I find it convenient to employ the respectively independent laps above described so that the minor and major lens surfaces may be abraded by different operators at different times; it is to be understood that such conoidal laps may be employed to simultaneously abrade both the major and minor surfaces of the same glass. For instance, as shown in Fig. XXX, the laps 146 and 147 which have annular abrading surfaces respectively adapted to abrade the major lens surfaces 98 and minor lens surfaces 99 of the glass 13 which is rotated by the holder 12, shown in said figure, have the common spindle 149 and may be simultaneously rotated, upon the same axis, by the belts 101, at respectively different speeds, if desired, or they may both be rigidly connected with said spindle by their respective set screws 151 and 152 so as to be rotated together. The relative axial position of said laps 146 and 147 may be precisely predetermined by adjustment of the nuts 154 which are in screw threaded engagement with the inner hub of said lap 146. Such construction and arrangement is advantageous in that the laps 146 and 147 may have their abrading surfaces separately ground to a variable extent and yet be precisely adjusted for the desired coöperative effect upon the glass.

Whether rotated independently or clamped together, as above described; said laps 146 and 147 are conveniently mounted for rotation in the spindle bearing pivot frame 156 having the adjustable bearing screws 157 and 158 which may be set to hold said spindle 149, or the spindles of any of the laps above described. Said pivot frame 156 is conveniently mounted for oscillation in the yoke 159 which has the set screw 160 for securing it in rigid relation with the cap 29 of the spindle 18 above described, and carries at the lower ends of its bifurcations, opposite, axially alined screws 162 having conical heads 163 fitted in corresponding sockets in said pivot frame 156 and having wing nuts 164, exterior to said yoke 159 so that said frame 156 may be freed for oscillation in said yoke or clamped in rigid relation therewith. I prefer to limit the oscillatory movement of said frame 156 in said yoke 159 by providing the latter with the clamping screw 167 having the conical head 168 extending in the arcual slot 169 in said frame 156; said screw 167 being provided with the wing nut 170 exterior to said yoke, by which said frame 156 may be clamped in rigid relation with said yoke. Of course, if a permanently rigid construction is desired, the bearing screws 157 and 158 may be directly mounted in the yoke 159, without the interposition of the frame 156.

As indicated in Fig. XXXI either or both of said laps 146 and 147 may have its abrading surface provided with a cover of textile fabric or other flexible sheet material 125 retained thereon by an elastic sphincteral band 126.

As shown in Fig. XXXII, my improved surfacing mechanism may be further simplified by providing a single lap 173 having the respectively differently curved annular abrading surfaces 174 and 175, meeting at the circular line indicated at 176 and respectively adapted for abrading the major lens surfaces 98 and minor lens surfaces 99 of the glass 13 which is mounted to be rotated on the holder 12 as above described. Said lap 173 may be mounted for rotation in any of the lap spindle bearings above described but is shown mounted in the bearing 128 supported by the lever 52 with which it is adjustably connected by the coupling 76 above described.

Said lap 173 has annular abrading surfaces which are like those of the laps 56, 57, 117, 121, 146 and 147 in that they are respectively differently curved transversely and circumferentially and, as indicated in Fig. XXXIII, the annular abrading surfaces 174 and 175 of said lap 173 are in contact with the glass only at a line 178 which is radial with respect to the lap axis.

As the laps above described present only respective lines of contact to the major and minor lens surfaces, and the former are of greater area than the latter, a longer time is required to produce a given surface upon the major areas than upon the minor areas, although the difference is minimized by the relatively greater diameter and consequent surface speed of movement of the annular abrading surfaces of the laps which are applied to the major areas. Therefore, I find it convenient to provide the lap 180 shown in Fig. XXXIV, which differs from the lap 173 above described in that its annular abrading surface 181 which is presented to the major glass surfaces 98 is spherically curved i. e., arcually curved the same both transversely and circumferentially; so that, as indicated in Fig. XXXV, said surface 181 presents an area of contact to the glass which is a lune of a spherical surface, the contour thereof, in plan, being indicated by the dash lines 182 in Fig. XXXV. Said spherical abrading surface of the lap 180 terminates at the circle indicated by the dotted line 184 in Fig. XXXIV, and the adjacent annular abrading surface 185, which is presented to the minor glass areas 99, is arcually curved respectively differently transversely and circumferentially so as to present only a line of contact to the glass as indicated at 187 in Fig. XXXV. Such construction of the abrading surface 185 is necessitated by the fact that its curvature (four dioptric) is of greater radius transversely than the curvature (six dioptric) of said abrading surface 181, and, if spherically disposed would, of course, sweep over the major glass areas 98 and eliminate the desired curvature of the latter.

It may be observed that in the employment of both of the laps 173 and 180 the smaller circumferential edges of the abrading surfaces which are respectively in contact with the major and minor glass areas extend obliquely over the circular junction line between said areas, from respectively opposite sides of said line; whereby the glass is abraded in a direction transverse to said junction line, so as to sharply define the latter.

It is to be understood that said laps 173 and 180 may have their abrading surfaces covered with textile fabric or other flexible sheet material 125 retained thereon by elastic sphincterial bands 126, as indicated in Fig. XXXIV.

It may be observed that the ball bearings above described have no means for compensating for wear which is incident to the rotation of the laps at high speed, and, although they are of an ordinary commercial type and may be readily and cheaply replaced I prefer to employ in each of the lap spindle bearings above described, ball bearings which are adjustable to not only compensate for wear but compensate for slight differences in the diameters of the lap spindles which are adapted to slide through the sleeves 90 of said bearings, to and from their operative position. Therefore, I have shown in Fig. XXXIV a lap spindle bearing casing 190 having tightly but removably fitted therein a ball bearing including the stationary race ring 191 and rotatable sleeve 192; the latter being radially split at both ends so that it may be constricted upon the lap spindles to rigidly engage them, regardless of slight differences in their respective diameters. Said sleeve 192 has its conical end 193 encircled by the double conical annular ball race ring 195 for the balls 196 which are embraced between said ring 195 and the nut 198 which is in screw threaded engagement with the upper end of said sleeve 192. Said nut 198 is a complete annulus but has radial notches 199 which may be engaged by a screw driver or similar implement inserted through the opening 200 in said bearing casing 190 to hold said nut 198 temporarily stationary while the sleeve 192 is being adjusted in engagement therewith. The construction and arrangement above described is such that when said nut 198 is temporarily prevented from rotating with the sleeve 192, and the latter is turned, either by a tool engaging the radial slots therein or by frictional engagement with the lap spindle, said nut 198 is drawn toward the race ring 195 to take up all lost motion. Said screw thread connecting said sleeve 192 with said nut 198 is preferably so inclined as to be tightened by rotation of said sleeve in the direction in which it is rotated with the lap spindle.

Although the supports for the lap spindle bearings above described as capable of oscillatory movement may be rigidly secured when adjusted to the proper angle to produce the desired surface upon the glass, and the curvature of the glass surfaces abraded by the laps thus supported may be precisely predetermined by such adjustment and maintenance of the laps; it is to be noted that ordinarily lens surfacing operations are facilitated by permitting the laps to have such freedom of movement as to accommodate themselves to the curvature of the glass, particularly during the polishing operation. Therefore, it may be observed that the bearings constructed and arranged in accordance with my invention as above described, permit such freedom of movement, and laps embodying my invention may be thus used. For instance, glass which has been surfaced to the desired curvature by any convenient means and requires to be finally finished or polished may be subjected to the operation of the conoidal laps above described, with the latter free to oscillate to such extent as to accommodate themselves to the curvature determined by the glass itself, and, in such use of said laps their effect is rendered as accurate as possible by the fact that their centers of oscillation are nearer the surface of the glass being abraded than the center of curvature of the surface which is being formed; so as to stabilize the laps, with respect to the glass, regardless of their freedom aforesaid. It may be observed that in Fig. XXX the center of oscillation of the laps is below the surface of the glass which is being abraded, as distinguished from the construction and arrangement illustrated in the preceding figures, wherein the centers of oscillation of the respective laps are above the glass; however, in either case, the centers of oscillation are intermediate of the length of the lines of contact of the laps with the glass. Moreover, it is to be noted that when permitted such freedom of oscillation, it is limited to planes which are radial with respect to the laps and coincident with the lines of contact which the laps present to the glass.

In view of the state of the art with reference to which the appended claims are limited; it may be observed that in all of the forms of this invention illustrated the upper, tool carrying, spindles are not only axially movable, but provided with means to precisely effect their axial adjustment during their operation, and that in every form shown, said spindles are carried by levers movable to variably determine the angular position of said spindles. Moreover, that in the forms shown in Figs. XIII, XV, XXVIII, XXX, XXXII, XXXIV, XXXVI and XXXVII, said spindles are carried by two levers, whereby they may be angularly adjusted in each of two, transversely located, planes; so that the relative position of the tool and the glass may be precisely variably determined, during the surfacing operation, without axial or angular adjustment of the glass.

I do not desire to limit myself to the precise details of construction and arrangement above described as it is obvious that various modifications may be made therein without departing from the essential features of my invention as defined in the appended claims.

I claim:—

1. In mechanism for making bifocal lenses; the combination with means for holding a pair of lens blanks, having major and minor lens areas upon the same face thereof, with their respective minor areas adjoining each other and between their respective major areas; of means arranged to rotate said blanks, together, upon an axis intersecting the centers of curvature of all of said areas; means common to both blanks arranged to abrade them, including a rotary lap having its axis inclined obliquely transversely with respect to the axis of rotation of said blanks and having an annular abrading surface, extending diagonally transversely to the axis of rotation of said lap, presenting only a transverse line of contact to said blanks, in a plane which is radial to the axis of rotation of said lap and tangential to a circle of rotation of said blanks; the smaller circumferential edge of said abrading surface being presented tangentially to the junction line between said major and minor areas, so that said edge extends over said junction line from the point of contact of said surface with the blanks; whereby, the edge of the area of the blank with which said abrading surface is in contact is abraded in a direction transverse to said junction line, so as to sharply define the latter.

2. In mechanism for making bifocal lenses, the combination with means for holding a pair of lens blanks with their respective minor areas adjoining each other and between their respective major areas; of means arranged to rotate said blanks, together; means common to both blanks arranged to abrade them, including a rotary lap having its axis inclined transversely to the axis of rotation of said blanks and not extending in any plane including the axis of rotation of said blanks, and having an annular perimetral abrading surface presenting only a transverse line of contact to said blanks, radially to said lap and tangentially to a circle of rotation of said blanks; a spindle stationary in said lap; and a bearing for said spindle.

3. In mechanism for making bifocal lenses, the combination with means for holding a pair of lens blanks with their respective minor areas adjoining each other and between their respective major areas; of means arranged to rotate said blanks, together; means common to both blanks arranged to abrade them, including a rotary lap having its axis inclined transversely with respect to the axis of rotation of said blanks, and having an annular perimetral abrading surface presenting only a transverse line of contact to said blanks, radially to said lap; a spindle stationary in said lap; and a bearing for said spindle.

4. In mechanism for making bifocal lenses, the combination with means for holding a pair of lens blanks with their respective minor areas adjoining each other and between their respective major areas; of means arranged to rotate said blanks, together; means common to both blanks arranged to abrade them, including a rotary lap having its axis inclined transversely to the axis of rotation of said blanks and not extending in any plane including the axis of rotation of said blanks, and having an annular perimetral abrading surface presenting only a transverse line of contact to said blanks, tangentially to a circle of rotation of said blanks; a spindle stationary in said lap; and a bearing for said spindle.

5. In mechanism for making bifocal lenses, the combination with a rotary holder for the surface to be abraded; of a rotary lap having an abrading surface presenting only a transverse line of contact to the surface to be abraded; said line being in obliquely transverse relation to the axes of rotation of said holder and lap, and said axes being in obliquely transverse relation, and extending in respectively different planes, and not in any common plane, a spindle stationary in said lap; a bearing for said spindle; and means supporting said bearing, permitting oscillation thereof; whereby said lap may be adjusted in correspondence with the curvature of the surface to be abraded.

6. In mechanism for making bifocal lenses, the combination with a rotary holder for the surface to be abraded; of a rotary lap having an annular abrading surface presenting only a transverse line of contact to the surface to be abraded; said line being in obliquely transverse relation to the axis of rotation of said lap; a spindle stationary in said lap; a bearing for said spindle; and means supporting said bearing, permitting oscillation thereof; whereby said lap may be adjusted in correspondence with the curvature of the surface to be abraded.

7. In mechanism for making bifocal lenses, the combination with a rotary holder for the surface to be abraded; of a rotary lap having an annular abrading surface presenting only a transverse line of contact to the surface to be abraded; said line being in obliquely transverse relation to the axis of rotation of said holder; a spindle stationary in said lap; a bearing for said spindle; and means supporting said bearing, permitting oscillation thereof; whereby said lap may be adjusted in correspondence with the curvature of the surface to be abraded.

8. In mechanism for making bifocal lenses, the combination with a rotary holder for the surface to be abraded; of a rotary lap having an abrading surface presenting only a transverse line of contact to the surface to be abraded; said line being in obliquely transverse relation to the axis of rotation of said lap, and the axes of rotation of said holder and lap being in obliquely transverse relation, and extending in respectively different planes.

9. In mechanism for making bifocal lenses, the combination with a rotary holder for the surface to be abraded; of a rotary lap having an annular abrading surface presenting only a transverse line of contact to the surface to be abraded; one end of said line being nearer the lap axis than the other end.

10. In mechanism for making bifocal lenses, the combination with a rotary holder for the surface to be abraded; of a rotary lap having an annular abrading surface presenting only a transverse line of contact to the surface to be abraded; one end of said line being nearer the holder axis than the other end.

11. In mechanism for making bifocal lenses, the combination with a rotary holder for the surface to be abraded; of a rotary lap having a circularly bounded abrading surface presenting only a transverse line of contact to the surface to be abraded; the axes of rotation of said holder and lap being in obliquely transverse relation, and extending in respectively different planes; a spindle stationary in said lap; a bearing for said spindle; and means supporting said bearing, permitting oscillation thereof; whereby said lap may be adjusted in correspondence with the curvature of the surface to be abraded.

12. In mechanism for making bifocal lenses, the combination with a rotary holder for the surface to be abraded; of a rotary lap having an abrading surface presenting only a transverse line of contact to the surface to be abraded; the axes of rotation of said holder and lap being in obliquely transverse relation; a spindle stationary in said lap; a bearing for said spindle; and means supporting said bearing, permitting oscillation thereof; whereby said lap may be adjusted in correspondence with the curvature of the surface to be abraded.

13. In mechanism for making bifocal lenses, the combination with a rotary holder for the surface to be abraded; of a rotary lap having a circular abrading surface presenting only a transverse line of contact to the surface to be abraded; the axes of rotation of said holder and lap being in obliquely transverse relation, and extending in respectively different planes.

14. In mechanism for making bifocal lenses, the combination with a rotary holder for the surface to be abraded; of a rotary lap having an abrading surface presenting only a transverse line of contact to the surface to be abraded; the axes of rotation of said holder and lap being in obliquely transverse relation.

15. In mechanism for making bifocal lenses, the combination with a rotary glass holder, of a lever extending transversely to said holder; a universal fulcrum for said lever; a bearing for a rotary lap carried by said lever; means arranged to secure said bearing in adjusted relation with said lever, including a pivotal connection and clamping means; a rotary lap having a spindle journaled in said bearing, and an abrading surface in rigid relation with said spindle; and means whereby the abrading action of said lap with respect to the glass carried by said holder may be precisely limited, including a stationary support, a stop member adjustable both parallel to and transversely to the axis of said glass holder, and means arranged to rigidly clamp said stop member in adjusted position upon said support.

16. In mechanism for making bifocal lenses, the combination with a rotary glass holder, of a lever extending transversely to said holder; a universal fulcrum for said lever; a bearing for a rotary lap carried by said lever; means arranged to secure said bearing in adjusted relation with said lever; a rotary lap having a spindle journaled in said bearing, and an abrading surface in rigid relation with said spindle; and means whereby the abrading action of said lap with respect to the glass carried by said holder may be precisely limited, including a stationary support, a stop member adjustable both parallel to and transversely to the axis of said glass holder, and means arranged to rigidly clamp said stop member in adjusted position upon said support.

17. In mechanism for making bifocal lenses, the combination with a rotary glass holder, of a lever extending transversely to said holder; a universal fulcrum for said lever; a bearing for a rotary lap carried by said lever; means arranged to secure said bearing in adjusted relation with said lever; a rotary lap having a spindle journaled in said bearing, and an abrading surface in rigid relation with said spindle; and means whereby the abrading action of said lap with respect to the glass carried by said holder may be precisely limited, including a stationary support, a movable stop member, and means arranged to rigidly secure said stop member in adjusted position upon said support.

18. In mechanism for making bifocal lenses, the combination with a rotary glass holder, of a lever extending transversely to said holder; a fulcrum for said lever; a bearing for a rotary lap carried by said lever; means arranged to secure said bearing in adjusted relation with said lever; a rotary lap journaled on said bearing and having an abrading surface; and means whereby the abrading action of said lap with respect to the glass carried by said holder may be precisely limited, including a stationary support, a stop member adjustable both parallel to and transversely to the axis of said glass holder, and means arranged to rigidly clamp said stop member in adjusted position upon said support.

19. In surfacing mechanism, the combination with means for holding the material which is to be surfaced; of means arranged to rotate said material; a rotary lap having an abrading surface extending in concentric relation to its axis; a bearing in which said lap is journaled; means supporting said bearing with said lap in operative position, with its axis inclined obliquely transversely with respect to the axis of rotation of said material, presenting only a transverse line of contact to said material in a plane which is radial to the axis of rotation of said lap and tangential to a circle of rotation of said material; said supporting means being constructed and arranged to permit oscillation of said axis; and means limiting the freedom of oscillation of said lap to said radial plane.

20. In surfacing mechanism, the combination with means for holding the material which is to be surfaced; of means arranged to rotate said material; a rotary lap having an abrading surface extending in concentric relation to its axis; a bearing in which said lap is journaled; means supporting said bearing with said lap in operative position, with its axis inclined obliquely transversely with respect to the axis of rotation of said material, presenting only a transverse line of contact to said material; said supporting means being constructed and arranged to permit oscillation of said axis; and means limiting the freedom of oscillation of said lap to a radial plane.

21. In surfacing mechanism, the combination with means for holding the material which is to be surfaced; of means arranged to rotate said material; a rotary lap having an abrading surface encircling its axis; means supporting said lap in operative position, with its axis inclined obliquely transversely with respect to the axis of rotation of said material, presenting only a transverse line of contact to said material; said supporting means being constructed and arranged to permit oscillation of said axis; and means limiting the freedom of oscillation of said lap to a radial plane.

22. In a grinding apparatus for producing spherical surfaces, the combination with a rotatable grinding tool having its grinding surface located at a distance from its axis of rotation and its radial curvature, in any radial plane, an arc of a circle eccentric with respect to said axis; of a rotatable work holder; means for supporting said tool with its axis between the axis of rotation of the work holder and the peripheral portions thereof; said tool being movable toward the work holder and free to oscillate; and means limiting the freedom of oscillation of said tool to a plane radial to its axis.

23. In a grinding apparatus for producing spherical surfaces, the combination with a rotatable grinding tool having its grinding surface encircling its axis of rotation and with a radial curvature eccentric with respect to said axis; of a rotatable work holder; means for supporting said tool with its axis between the axis of rotation of the work holder and the peripheral portions thereof; said tool being movable toward the work holder and free to oscillate; and means limiting the freedom of oscillation of said tool to a plane radial to its axis.

24. In a grinding apparatus for producing spherical surfaces, the combination with a rotatable grinding tool having its grinding surface encircling its axis of rotation and with a radial curvature eccentric with respect to said axis; of a rotatable work holder; means for supporting said tool with its axis transverse to the axis of rotation of the work holder; said tool being movable toward the work holder and free to oscillate; and means limiting the freedom of oscillation of said tool to a plane radial to its axis.

25. In surfacing mechanism, the combination with means for rotating the material which is to be surfaced; of a rotary lap having a conoidal surface with its axis inclined transversely with respect to the axis of rotation of said material, presenting only a transverse line of contact to said material in a plane which is radial to the axis of rotation of said lap; means supporting said lap permitting oscillation of its axis; and means limiting the freedom of oscillation of said lap to said radial plane.

26. In surfacing mechanism, the combination with means for rotating the material which is to be surfaced; of a rotary lap having a conoidal surface with its axis inclined diagonally transversely with respect to the axis of rotation of said material, presenting only a transverse line of contact to said material in a plane which is radial to the axis of rotation of said lap and tangential to a circle of rotation of said material.

27. In surfacing mechanism, the combination with means for rotating the material which is to be surfaced; of a rotary lap having a conoidal surface with its axis inclined diagonally transversely with respect to the axis of rotation of said material, presenting only a transverse line of contact to said material in a plane which is radial to the axis of rotation of said lap.

28. In surfacing mechanism, the combination with means for rotating the material which is to be surfaced; of a rotary lap having a conoidal surface with its axis inclined obliquely transversely with respect to the axis of rotation of said material.

29. In surfacing mechanism, the combination with means for rotating the material which is to be surfaced; of a rotary lap having a conoidal surface with its axis extending transversely with respect to the axis of rotation of said material, presenting only a transverse line of contact to said material in a plane which is radial to the axis of rotation of said lap and tangential to a circle of rotation of said material; means supporting said lap permitting oscillation of its axis; and means limiting the freedom of oscillation of said lap to said radial plane.

30. In surfacing mechanism, the combination with means for rotating the material which is to be surfaced; of a rotary lap having a conoidal surface with its axis extending transversely with respect to the axis of rotation of said material, presenting only a transverse line of contact to said material in a plane which is radial to the axis of rotation of said lap and tangential to a circle of rotation of said material; means supporting said lap permitting oscillation of its axis.

31. In surfacing mechanism, the combination with means for rotating the material which is to be surfaced; of a rotary lap having a conoidal surface with its axis extending transversely with respect to the axis of rotation of said material, presenting only a transverse line of contact to said material in a plane which is radial to the axis of rotation of said lap and tangential to a circle of rotation of said material.

32. In surfacing mechanism, the combination with means for rotating the material which is to be surfaced; of a rotary lap having a conoidal surface with its axis extending transversely with respect to the axis of rotation of said material, presenting only a transverse line of contact to said material in a plane which is radial to the axis of rotation of said lap; one end of said line being nearer the lap axis than the other end.

33. In surfacing mechanism, the combination with means for rotating the material which is to be surfaced; of a rotary lap having a conoidal surface with its axis extending transversely with respect to the axis of rotation of said material; one edge of said surface being nearer the lap axis than the other edge.

34. In surfacing mechanism, the combination with means for rotating the material which is to be surfaced; of a rotary lap having a conoidal surface with its axis extending transversely with respect to the axis of rotation of said material, presenting only a transverse line of contact to said material; means supporting said lap permitting oscillation of its axis; and means limiting the freedom of oscillation of said lap to a plane.

35. In surfacing mechanism, the combination with means for rotating the material which is to be surfaced; of a rotary lap having a conoidal surface arcually curved respectively differently concentrically to its axis and transversely thereto with its axis extending transversely with respect to the axis of rotation of said material, presenting only a transverse line of contact to said material in a plane which is radial to the axis of rotation of said lap; one end of said line being nearer the lap axis than the other end.

36. In surfacing mechanism, the combination with means for rotating the material which is to be surfaced; of a rotary lap having a conoidal surface arcually curved respectively differently concentrically to its axis and transversely thereto with its axis extending transversely with respect to the axis of rotation of said material; one edge of said surface being nearer the lap axis than the other edge.

37. In surfacing mechanism, the combination with means for rotating the material which is to be surfaced; of a rotary lap having a conoidal surface arcually curved respectively differently concentrically to its axis and transversely thereto with its axis extending transversely with respect to the axis of rotation of said material, presenting only a transverse line of contact to said material; means supporting said lap permitting oscillation of its axis; and means limiting the freedom of oscillation of said lap to a plane.

38. In surfacing mechanism, the combination with means for holding the material which is to be surfaced; of means arranged to rotate said material; a rotary lap having a rigid spindle and an abrading surface extending in concentric relation to its axis; a bearing in which said spindle is journaled; means supporting said bearing with said lap in operative position, with its axis inclined obliquely transversely with respect to the axis of rotation of said material, presenting only a transverse line of contact to said material in a plane which is radial to the axis of rotation of said lap and tangential to a circle of rotation of said material; said supporting means being constructed and arranged to permit oscillation of said axis, the center of such oscillation being nearer said abrading surface than the center of transverse curvature of the latter, and intermediate of the length of said line of contact; resilient means for pressing said center toward the surface being abraded; adjustable means for limiting the movement of the lap toward the latter surface; and means limiting the freedom of oscillation of said lap to said radial plane.

39. In a grinding apparatus for producing spherical surfaces, the combination with a rotatable grinding tool having its grinding surface located at a distance from its axis of rotation and its radial curvature eccentric with respect to said axis; of a rotatable work holder; means for supporting said tool with its axis between the axis of rotation of the work holder and the peripheral portions thereof; said tool being movable toward the work holder and free to oscillate, the center of such oscillation being nearer said abrading surface than the center of transverse curvature of the latter, and intermediate of the length of said line of contact; resilient means for pressing said center toward the surface being abraded; adjustable means for limiting the movement of the lap toward the latter surface; means limiting the freedom of oscillation of said tool to a plane radial to its axis; means for rotating said tool; and means for rotating said work holder.

40. In surfacing mechanism, the combination with means for rotating the material which is to be surfaced; of a rotary lap having a conoidal surface with its axis inclined transversely with respect to the axis of rotation of said material, presenting only a transverse line of contact to said material in a plane which is radial to the axis of rotation of said lap and tangential to a circle of rotation of said material; means supporting said lap permitting oscillation of its axis, the center of such oscillation being nearer said abrading surface than the center of transverse curvature of the latter, and intermediate of the length of said line of contact; resilient means for pressing said center toward the surface being abraded; adjustable means for limiting the movement of the lap toward the latter surface; and means limiting the freedom of oscillation of said lap to said radial plane.

41. In surfacing mechanism, the combination with means for rotating the material which is to be surfaced; of a rotary lap having a conoidal surface with its axis extending transversely with respect to the axis of rotation of said material, presenting only a transverse line of contact to said material; means supporting said lap permitting oscillation of its axis, the center of such oscillation being nearer said abrading surface than the center of transverse curvature of the latter, and intermediate of the length of said line of contact; and means limiting the freedom of oscillation of said lap to a plane.

42. In surfacing mechanism, the combination with means for rotating the material which is to be surfaced; of a rotary lap having a conoidal surface arcually curved respectively differently concentrically to its axis and transversely thereto with its axis extending transversely with respect to the axis of rotation of said material, presenting only a transverse line of contact to said material in a plane which is radial to the axis of rotation of said lap and tangential to a circle of rotation of said material; means supporting said lap permitting oscillation of its axis, the center of such oscillation being nearer said abrading surface than the center of transverse curvature of the latter, and intermediate of the length of said line of contact; and means limiting the freedom of oscillation of said lap to said radial plane.

43. In surfacing mechanism, the combination with means for rotating the material which is to be surfaced; of a rotary lap having a conoidal surface with its axis extending transversely with respect to the axis of rotation of said material, presenting only a transverse line of contact to said material; means supporting said lap permitting oscillation of its axis, the center of such oscillation being nearer said abrading surface than the center of transverse curvature of the latter, within said lap and intermediate of the length of said line of contact; and means limiting the freedom of oscillation of said lap to a plane.

44. In surfacing mechanism, the combination with means for rotating the material which is to be surfaced; of a rotary lap having a conoidal surface arcually curved respectively differently concentrically to its axis and transversely thereto and presenting only a transverse line of contact to said material; and means supporting said lap in operative relation to said material, adjustable to shift said line of contact to and from planes respectively in radial relation to the axis of rotation of said material and in tangential relation to a circle of rotation of said material; whereby surfaces of different spherical curvature may be produced by a lap of constant curvature.

45. In surfacing mechanism, the combination with means for rotating the material which is to be surfaced; of a rotary lap having a surface curved respectively differently concentrically to its axis and transversely thereto; and means supporting said lap in operative relation to said material, adjustable to shift the axis of said lap to and from planes respectively in radial relation to the axis of rotation of said material and in tangential relation to a circle of rotation of said material; whereby surfaces of different curvature may be produced by a lap of constant curvature.

46. In surfacing mechanism, the combination with means for rotating the material which is to be surfaced; of a rotary lap having a conoidal surface arcually curved respectively differently concentrically to its axis and transversely thereto and presenting only a transverse line of contact to said material; and means supporting said lap in operative relation to said material, with said line of contact in a plane in tangential relation to a circle of rotation of said material, and with the axis of rotation of said material intersecting the center of curvature of said line; whereby a spherical surface of a given radius may be produced by a lap surface of less radius.

47. In surfacing mechanism, the combination with means for rotating the material which is to be surfaced; of a rotary lap having a surface arcually curved respectively differently concentrically to its axis and transversely thereto and presenting only a transverse line of contact to said material; and means supporting said lap in operative relation to said material with said line of contact in a plane in tangential relation to a circle of rotation of said material; whereby a spherical surface of a given radius may be produced by a lap surface of less radius.

48. The combination with a rotatable lens blank holder; of a lap having an annular conoidal abrading surface rotatable upon an axis inclined to the axis of the blank holder; and means for adjusting the lap axis both longitudinally and transversely.

49. The combination with a rotatable lens blank holder; of a lap having an annular 50. The combination with a rotatable lens blank holder; of a lap having an annular conoidal abrading surface rotatable upon an axis inclined to the axis of the blank holder; means for adjusting the lap axis holder; means for adjusting the lap axis both longitudinally and transversely; and stop means adjustable to precisely limit the approach of said lap to said holder.

51. The combination with a rotatable lens blank holder; of a lap having an annular conoidal abrading surface rotatable upon an axis inclined to the axis of the blank holder; means for adjusting the lap axis transversely; and stop means adjustable to precisely limit the approach of said lap to said holder.

52. The combination with a rotatable lens blank holder; of a lap having an annular conoidal abrading surface, circularly arcually curved both concentrically with respect to said axis and transversely, the radius of its transverse curvature being greater than the radius of its concentric curvature, rotatable upon an axis inclined to the axis of the blank holder; means for adjusting the lap axis transversely to a plane in which it extends; and stop means adjustable to precisely limit the approach of said lap to said holder.

53. The combination with a rotatable lens blank holder; of a lap having an annular conoidal abrading surface, circularly arcually curved both concentrically with respect to said axis and transversely, the radius of its transverse curvature being greater than the radius of its concentric curvature, rotatable upon an axis inclined to the axis of the blank holder; and stop means adjustable to precisely limit the approach of said lap to said holder.

54. In mechanism for making bifocal lenses, the combination with a rotary glass holder, of a lever extending transversely to said holder; a fulcrum for said lever; a bearing for a rotary lap carried by said lever; a rotary lap journaled on said bearing and having an abrading surface; and means whereby the abrading action of said lap with respect to the glass carried by said holder may be precisely limited, including a stationary support, a stop member adjustable both parallel to and transversely to the axis of said glass holder, and means arranged to rigidly secure said stop member in adjusted position upon said support.

55. The combination with a rotatable glass holder; of a lap having an annular conoidal abrading surface rotatable upon an axis inclined to the axis of the glass holder; and means for adjusting the lap axis.

56. The combination with a rotatable glass holder; of a lap having an annular conoidal abrading surface rotatable upon an axis inclined to the axis of the glass holder; whereby said abrading surface is presented in contact with the glass throughout a single line in a radial plane, said line being coextensive with the transverse extent of said surface.

57. The combination with a rotatable glass holder; of an abrading tool having two annular abrading surfaces in spaced relation; one of said surfaces being curved differently circumferentially and radially, and the other of said surfaces being spherical; means whereby the relative position of said surfaces may be varied; and means arranged to secure them in adjusted position.

58. The combination with a rotatable glass holder; of an abrading tool having two annular abrading surfaces with a space between them; one of said surfaces being curved differently circumferentially and radially, and the other of said surfaces being spherical.

59. The combination with a rotatable glass holder; of an abrading tool having two annular abrading surfaces; one of said surfaces being curved differently circumferentially and radially, and having one edge nearer the axis of said holder than the other edge, and the other of said surfaces being spherical.

60. In lens surfacing mechanism, the combination with a rotary glass holder; of two rotary laps, each having an annular abrading surface arcually curved circumferentially and radially; said abrading surfaces being curved differently in the respective laps; and adjustable screw means, whereby the relative position of the respective abrading surfaces may be precisely determined and maintained with respect to an axis common to both laps, to predetermine their coincident effect upon the glass.

61. In lens surfacing mechanism, the combination with two opposed rotary spindles; of means arranged to rotate said spindles in opposite directions; a lever arranged to carry one of said spindles axially toward and away from the other, by movement upon its fulcrum; means, carried with said lever, arranged to detain said lever carried spindle in variable position with respect to said lever, including a bearing in which that spindle rotates and means extending transversely between that spindle and bearing; and stop means limiting the movement of said lever and the relative position of said spindles.

62. In lens surfacing mechanism, the combination with two opposed rotary spindles; of means arranged to rotate said spindles in opposite directions; a lever arranged to carry one of said spindles axially toward and away from the other, by movement upon its fulcrum; and means, carried with said lever, arranged to detain said lever carried spindle in variable position with respect to said lever, including a bearing in which that spindle rotates and means extending transversely between that spindle and bearing.

63. In lens surfacing mechanism, the combination with two opposed rotary spindles; of means arranged to rotate said spindles in opposite directions; a lever arranged to carry one of said spindles axially toward and away from the other, by movement upon its fulcrum; and means whereby said lever carried spindle is axially adjustable to rotate in different positions with respect to said lever.

64. In lens surfacing mechanism, the combination with two opposed rotary spindles; of means arranged to rotate one of said spindles independently of the other; a lever arranged to carry one of said spindles axially toward and away from the other, by movement upon its fulcrum; means, carried with said lever, arranged to detain said lever carried spindle in variable position with respect to said lever, including a bearing in which that spindle rotates and means extending transversely between that spindle and bearing; and stop means limiting the movement of said lever and the relative position of said spindles.

65. In lens surfacing mechanism, the combination with two opposed rotary spindles; of means arranged to rotate one of said spindles independently of the other; a lever arranged to carry one of said spindles axially toward and away from the other, by movement upon its fulcrum; and means, carried with said lever, arranged to detain said lever carried spindle in axially adjustable position with respect to said lever, including a bearing in which that spindle rotates, and means extending transversely between that spindle and bearing.

66. In lens surfacing mechanism, the combination with two opposed rotary spindles; of means arranged to rotate one of said spindles independently of the other; a lever arranged to carry one of said spindles axially toward and away from the other, by movement upon its fulcrum; and means, carried with said lever, arranged to axially adjust said lever carried spindle in different positions with respect to said lever.

67. In lens surfacing mechanism, the combination with two opposed rotary spindles; of a lever arranged to carry one of said spindles axially toward and away from the other, by movement upon its fulcrum; means, carried with said lever, arranged to detain said lever carried spindle in variable position with respect to said lever, including a bearing in which that spindle rotates and means extending transversely between that spindle and bearing; and stop means limiting the relative position of said spindles.

68. In lens surfacing mechanism, the combination with two opposed rotary spindles; of a lever arranged to carry one of said spindles axially toward and away from the other, by movement upon its fulcrum; and means, carried with said lever, arranged to detain said lever carried spindle in variable position with respect to said lever, including a bearing in which that spindle rotates, and means extending transversely between that spindle and bearing.

69. In lens surfacing mechanism, the combination with two opposed rotary spindles; of a lever arranged to carry one of said spindles axially toward and away from the other, by movement upon its fulcrum; and means, carried with said lever, whereby said lever carried spindle is axially adjustable with respect to said lever.

70. The combination with a rotatable glass holder; of a lap having an annular conoidal abrading surface rotatable upon an axis inclined to the axis of the glass holder.

71. In lens surfacing mechanism, the combination with two opposed rotary spindles; of a lever, of the second order, fulcrumed for freedom of movement both vertically and horizontally, arranged to carry one of said spindles axially toward and away from the other; and means, carried by said lever, whereby said lever carried spindle is axially adjustable with respect to said lever.

72. In lens surfacing mechanism, the combination with two opposed rotary spindles; of a lever, of the second order, arranged to carry one of said spindles axially toward and away from the other; and means, carried by said lever, whereby said lever carried spindle is axially adjustable with respect to said lever.

73. In lens surfacing mechanism, the combination with two opposed rotary spindles; of two levers connected to carry one of said spindles axially toward and away from the other spindle; said levers being respectively adjustable in different, transversely located, planes; whereby said spindles may be relatively angularly adjusted in each of such transversely related planes.

In testimony whereof, I have hereunto signed my name at Philadelphia, Pennsylvania, this third day of March, 1915.

ARTHUR E. PAIGE.

Witnesses:
Anna Israelvitz,
R. Agnes La Lande.